United States Patent
Dhoolam et al.

(10) Patent No.: US 9,826,030 B1
(45) Date of Patent: Nov. 21, 2017

(54) PLACEMENT OF VOLUME PARTITION REPLICA PAIRS

(71) Applicant: Amazon Technologies, Inc., Seattle, WA (US)

(72) Inventors: Surya Prakash Dhoolam, Seattle, WA (US); Christopher Magee Greenwood, Seattle, WA (US); Mitchell Gannon Flaherty, Seattle, WA (US); Marc John Brooker, Seattle, WA (US); Iain Michael Christopher Peet, Seattle, WA (US); Nishant Satya Lakshmikanth, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 152 days.

(21) Appl. No.: 14/731,337

(22) Filed: Jun. 4, 2015

(51) Int. Cl.
*G06F 15/16* (2006.01)
*H04L 29/08* (2006.01)

(52) U.S. Cl.
CPC .......... *H04L 67/1008* (2013.01); *H04L 67/32* (2013.01)

(58) Field of Classification Search
CPC ........................... H04L 67/1008; H04L 67/32
USPC ........................................................ 709/219
See application file for complete search history.

(56) References Cited

U.S. PATENT DOCUMENTS

| | | | |
|---|---|---|---|
| 5,499,192 A * | 3/1996 | Knapp | G06F 17/5054 716/102 |
| 7,814,307 B2 | 10/2010 | Powell et al. | |
| 8,396,843 B2 * | 3/2013 | Jayaraman | G06F 17/30088 707/692 |
| 8,443,077 B1 | 5/2013 | Lappas et al. | |
| 8,677,356 B2 * | 3/2014 | Jacobs | G06F 9/5077 718/1 |
| 8,712,960 B2 * | 4/2014 | Frost | G06F 17/30194 707/634 |
| 8,719,914 B2 * | 5/2014 | Edwards | G06F 9/5077 709/218 |
| 8,738,534 B2 * | 5/2014 | Clemencon | G06N 5/02 705/55 |
| 8,850,144 B1 * | 9/2014 | Natanzon | G06F 11/0712 711/162 |
| 8,850,528 B2 * | 9/2014 | Van Biljon | G06Q 30/04 707/783 |

(Continued)

OTHER PUBLICATIONS

"Failure Rate," Wikipedia, the Free Encyclopedia, May 17, 2015 <http://en.wikipedia.org/wiki/Failure_rate> [Retreived Jun. 4, 2015].

(Continued)

*Primary Examiner* — Melvin H Pollack
(74) *Attorney, Agent, or Firm* — Davis Wright Tremaine LLP

(57) ABSTRACT

A system and method for providing sets of partition placements, the system and method including, receiving at least one placement request for a set of partitions of a volume. Based at least in part on counts of pairs of partitions hosted by pairs of computing devices, the system and method further includes determining how suitable the pairs of computing devices are for placement of partitions of the set of partitions, generating a set of placements based at least in part on the determination, and providing the set of placements in response to the at least one placement request.

22 Claims, 7 Drawing Sheets

(56) References Cited

U.S. PATENT DOCUMENTS

| | | | |
|---|---|---|---|
| 8,868,711 B2* | 10/2014 | Skjolsvold | G06F 9/5077 709/223 |
| 8,881,141 B2* | 11/2014 | Koch | G06F 9/45558 718/1 |
| 8,949,585 B2* | 2/2015 | Hiltgen | G06F 9/4406 713/2 |
| 8,984,221 B2* | 3/2015 | Satoyama | G06F 3/0605 711/114 |
| 9,063,994 B1* | 6/2015 | Natanzon | G06F 17/30575 |
| 9,098,200 B2* | 8/2015 | Nakajima | G06F 3/0605 |
| 9,104,453 B2* | 8/2015 | Anand | G06F 9/45533 |
| 9,176,769 B2* | 11/2015 | Raghunathan | G06F 9/548 |
| 9,183,213 B2 | 11/2015 | Dickinson | |
| 9,229,749 B2 | 1/2016 | Chandrasekaran | |
| 9,239,996 B2* | 1/2016 | Moorthi | G06Q 10/06 |
| 9,306,978 B2 | 4/2016 | Lango et al. | |
| 9,313,044 B2 | 4/2016 | Tsai et al. | |
| 9,384,060 B2* | 7/2016 | Hunter | G06F 9/5077 |
| 9,384,061 B1* | 7/2016 | Deivanayagam | G06F 9/5083 |
| 9,459,903 B2 | 10/2016 | Gray | |
| 9,462,059 B2* | 10/2016 | Anumalasetty | H04L 41/082 |
| 9,473,365 B2* | 10/2016 | Melander | H04L 41/5054 |
| 9,483,639 B2 | 11/2016 | Sliwa et al. | |
| 9,489,630 B2* | 11/2016 | Achin | G06N 5/02 |
| 9,495,486 B1* | 11/2016 | Aluru | G06F 17/5009 |
| 9,503,517 B1 | 11/2016 | Brooker et al. | |
| 9,519,787 B2* | 12/2016 | Novak | G06F 21/575 |
| 9,537,973 B2 | 1/2017 | Batrouni et al. | |
| 9,547,521 B2* | 1/2017 | Gleyzer | G06F 9/44505 |
| 9,558,126 B2* | 1/2017 | Magdon-Ismail | G06F 12/0893 |
| 9,563,480 B2* | 2/2017 | Messerli | G06F 9/5072 |
| 9,563,683 B2* | 2/2017 | Abercrombie | G06F 17/30575 |
| 9,582,218 B2 | 2/2017 | Nishtala | |
| 9,594,592 B2* | 3/2017 | Challa | G06F 9/5038 |
| 2004/0226015 A1 | 11/2004 | Leonard et al. | |
| 2015/0235308 A1* | 8/2015 | Mick | G06Q 30/08 705/26.3 |
| 2015/0261952 A1 | 9/2015 | Sliwa et al. | |
| 2015/0288758 A1* | 10/2015 | Ori | H04L 67/1095 709/202 |
| 2015/0312116 A1* | 10/2015 | Taheri | H04L 67/10 709/224 |
| 2015/0319234 A1 | 11/2015 | Wang et al. | |
| 2015/0378762 A1* | 12/2015 | Saladi | H04L 41/0816 718/1 |
| 2015/0378785 A1* | 12/2015 | Tarasuk-Levin | G06F 9/4881 718/1 |
| 2015/0381453 A1* | 12/2015 | Skjolsvold | H04L 43/0876 709/224 |
| 2016/0087910 A1 | 3/2016 | Mittal et al. | |
| 2016/0112516 A1 | 4/2016 | Liu et al. | |
| 2016/0212202 A1* | 7/2016 | Birkestrand | H04L 67/10 |
| 2016/0266832 A1 | 9/2016 | Gaur et al. | |
| 2016/0277498 A1* | 9/2016 | Kulkarni | H04L 67/1097 |
| 2016/0295394 A1* | 10/2016 | Mijar | H04W 48/18 |
| 2016/0330137 A1* | 11/2016 | Avci | G06F 9/5016 |
| 2016/0335324 A1* | 11/2016 | Caulfield | G06F 17/30241 |
| 2016/0357739 A1 | 12/2016 | Rathinagiri et al. | |
| 2017/0032119 A1 | 2/2017 | Dore et al. | |
| 2017/0090993 A1* | 3/2017 | Malewicz | G06F 9/5077 |

OTHER PUBLICATIONS

Nath, S. et al., "Subtleties in Tolerating Correlated Failures in Wide-area Storage Systems," NSDI '06: 3rd Symposium on Networked Systems Design & Implementation, May 8-10, 2006, 14 pages, USENIX Association.

Greenan, K. M. et al., "Mean time to meaningless: MTTDL, Markov models, and storage system reliability," Article, Jan. 2010, 5 pages.

Brown, M., "The First Passage Time Distribution for a Parallel Exponential System with Repair," Technical Report No. 205, Aug. 15, 1974, 21 pages.

* cited by examiner

PLACEMENT OF VOLUME PARTITION REPLICA PAIRS

CROSS REFERENCE TO RELATED APPLICATION

This application incorporates by reference for all purposes the full disclosure of co-pending U.S. patent application Ser. No. 14/731,318, filed concurrently herewith, entitled "RELATIVE PLACEMENT OF VOLUME PARTITIONS."

BACKGROUND

The use of remote computing services, such as remote program execution services and remote data storage services has greatly increased in recent years. Customers may purchase these services from a computing resource service provider, and customer applications may be distributed over multiple virtual machine instances running on one or more computing systems. In some cases, these virtual machine instances run under a virtualization layer that exposes a logical volume stored on partitions distributed between data storage servers. However, determining how volume partitions should be distributed to achieve optimal performance, durability, and availability can be challenging, particularly when conditions, constraints, and partition locations can change over time.

BRIEF DESCRIPTION OF THE DRAWINGS

Various embodiments in accordance with the present disclosure will be described with reference to the drawings, in which.

DETAILED DESCRIPTION

Figure 1:
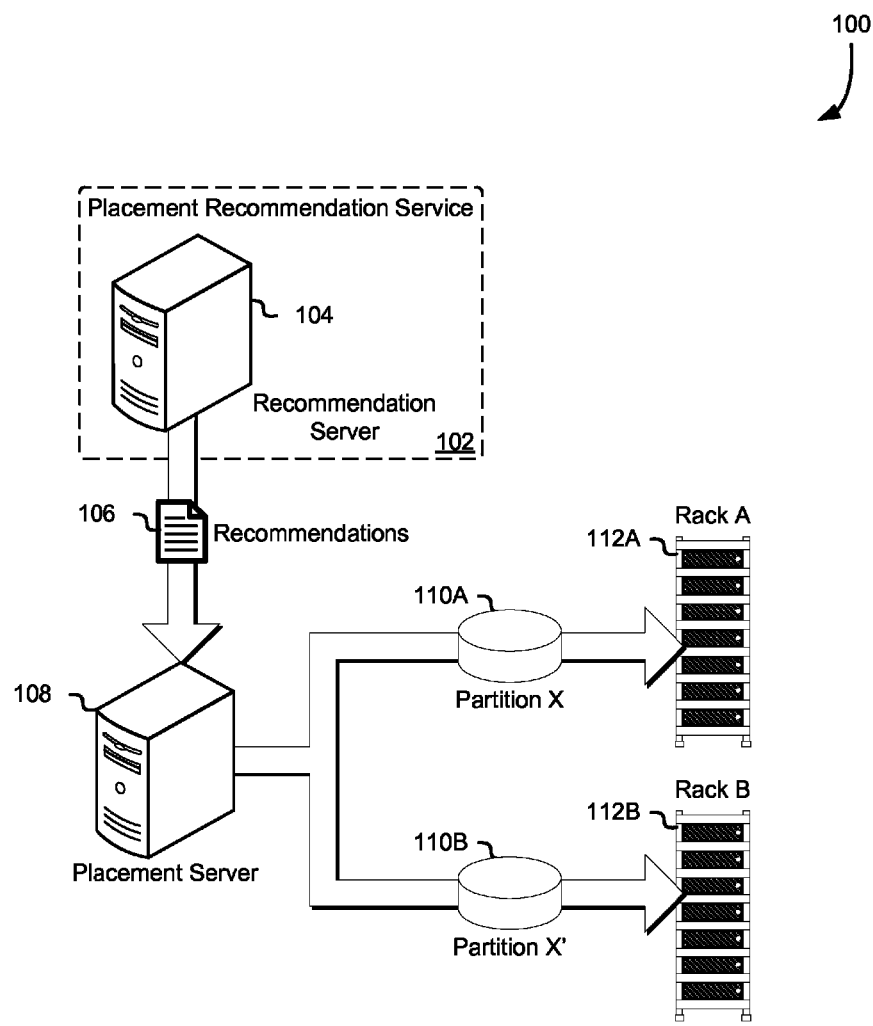
FIG. 1 illustrates an example of a recommendation server providing recommendations for a placement server for distributing partitions between racks in accordance with an embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested include a system and method for enhancing the performance of data storage services provided by a computing resource service provider to customers of the computing resource service provider. Such data storage services may include one or more network-attached block-level data storage devices. The performance enhancement provided by the present disclosure enables such data storage devices to dynamically determine an optimal scheme for distributing volume partitions among one or more data storage servers, based on information such as available space, a number of racks, a number of replicas, replica pair counts on server pairs, input/output operations per second requirements of the volume and characteristics of the storage devices, and the identity of the network of the network-attached block-level data storage devices.

A customer, system administrator of the computing resource service provider, application, service, placement server, or some other authorized entity, requests a first set of partition placements from a placement recommendation service or server, for placing a master partition of a replicated volume. Additionally or alternatively, the replicated volume comprises a set of master partitions which have been or will be replicated to a set of slave partitions such that, in the event of failure of a storage device for hosting a master partition or a slave partition, the remaining partition can be used as a backup in order to re-create the partition that was lost due to the failure. In response to the first request, the techniques of the present disclosure include generating and providing the first set of partition placements based at least in part on a server suitability score. In some examples, the term "partition placements" may be indications of one or more servers upon which to place a respective partition. The server suitability score may be the result of computing an algorithm configured to determine a level of suitability (i.e., gauge of how suitable a server is for placement of the specified partition) for placement of a specified partition. The server suitability score for each server may be generated based on factors such as performance characteristics of the storage devices of the server (e.g., input/output operations per second), amount of available space on the server, an identity of a rack hosting the server, an identity of a network of the server, replica pair counts between the server and other servers, room diversity in a data center (with respect to master and slave partitions), and state information, such as information about previously generated placements.

The techniques described in the present disclosure further include receiving a second request for a second set of partition placements for placing a slave partition of the replicated volume, the slave partition being the replica of the master partition whose placements were previously provided. In response to the second request, the techniques of the present disclosure include generating and providing the second set of partition placements based at least in part on the server suitability score, which, similar to the server suitability score of the first set of partition placements, may be based on factors such as performance characteristics of the storage devices of the server, amount of available space on the server, an identity of a rack hosting the server, an identity of a network of the server, replica pair counts between the server and other servers, and state information.

The described and suggested techniques improve the field of computing, and specifically the field of data storage, by providing a new and useful file system for improving the durability of data storage volumes by diversifying replica volume partitions across multiple servers to reduce the risk that a failure of a server or storage device could cause the loss of a storage volume. Additionally, the described and suggested techniques improve the functioning of computer systems by improving availability of volumes by diversifying replica volume partitions across multiple network devices and other communication devices to reduce the risk that a failure of a network device in a rack could cause a storage volume to be unavailable. Moreover, the described and suggested techniques offer meaningful advantages over general partitioning schemes by allowing the volume partition placement to be dynamically and periodically rebalanced to ensure that as, over time, partitions for a volume are moved and as constraints are changed volume partitions are still optimally placed in accordance with the constraints currently in effect.

FIG. 1 illustrates an aspect of an environment 100 in which an embodiment may be practiced. As illustrated in FIG. 1, the environment 100 may include a placement recommendation service 102 having a recommendation server 104 that provides a set of placements 106 on partition placement, and provides the set of placements 106 (also referred to as proposals) to a placement server 108. Based on the set of placements 106, the placement server 108 may distribute partitions 110A-10B between racks 112A-12B.

As noted, the present disclosure describes a system for dynamically determining a partitioning strategy for optimized geometry of data storage devices such as network-attached block-level storage devices and databases. In some examples, a "volume" may be a logical storage space within a data storage system in which data objects may be stored. The volume may be identified by a volume identifier. Data for the volume may reside in one physical storage device (e.g., a hard disk) or may comprise multiple partitions distributed across multiple storage devices. In some examples, a "partition," "storage partition," or "data storage partition" may refer to a section of a computer-readable storage medium that has been allocated to serve as logical storage for a volume. The partition may further include data for the volume stored within the allocated section. Such computer-readable storage mediums include, but are not limited to, magnetic media drives, solid state media, flash-based storage media, non-volatile memory, dynamic random access memory, and other types of hard drives and persistent storage. A volume may be comprised of a set of one or more partitions. For improved performance and fault tolerance, each partition of the set of partitions may reside on a different storage device (e.g., hard drive), and partitions assigned to different volumes may reside on the same storage device. For example, a first volume may be comprised of partitions A, B, C, and D on hard drives W, X, Y, and Z respectively. A second volume may be comprised of partitions E, F, G, and H also on respective hard drives W, X, Y, and Z.

The placement recommendation service 102 may be a service of a computing resource service provider configured to provide the set of placements 106 for placing partitions of volumes. Application programming interfaces for making requests to the placement recommendation service 102 may be provided by the computing resource service provider. The placement recommendation service 102 may include one or more physical or virtual computing systems, such as the recommendation server 104. As noted, the recommendation server 104 may be a server in a data center, such as the web server 706 or application server 708 of FIG. 7, multiple physical or virtual computing devices in a distributed system of a computing resource service provider, or any electronic client device such as the electronic client device 702. The recommendation server 104 may be configured to provide the set of placements 106 for the partitions 110A-10B of a volume in response to a request.

Figure 7:
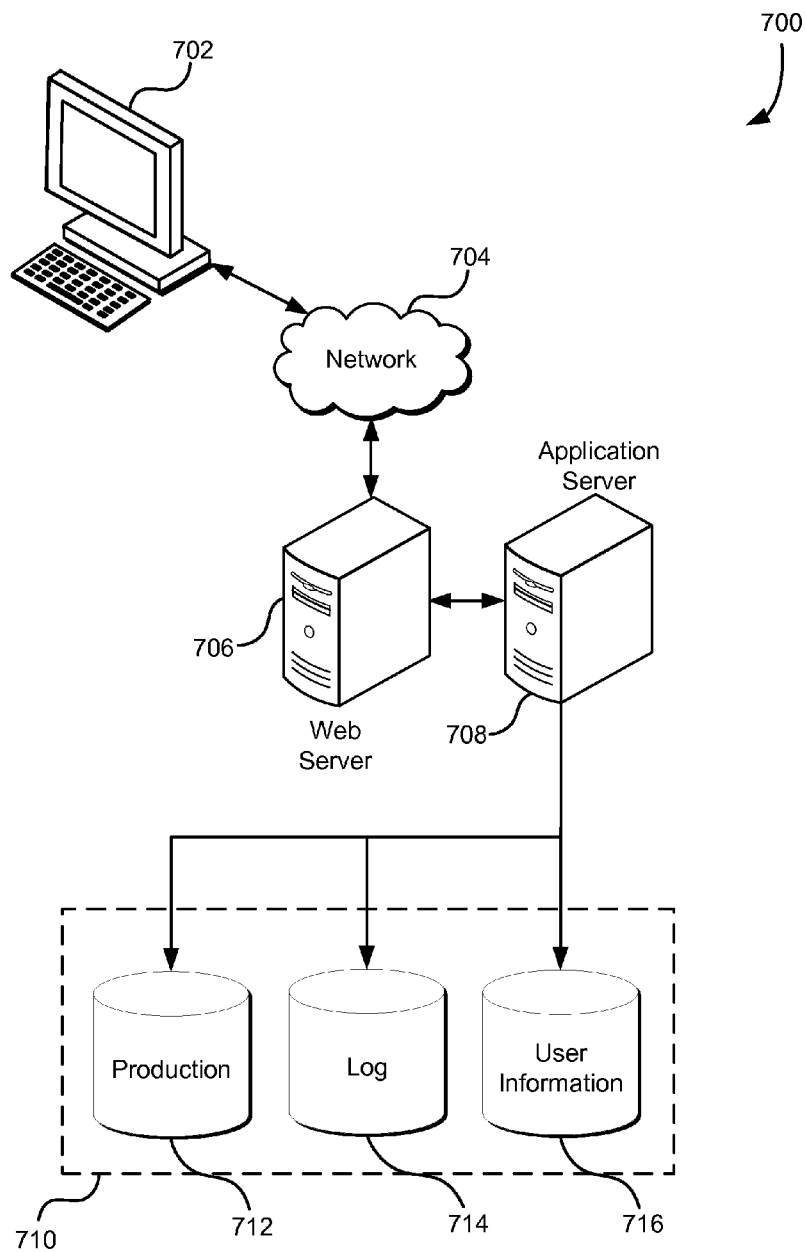
FIG. 7 illustrates an environment in which various embodiments can be implemented.

The placement server 108 may also be a server in a data center, such as the web server 706 or application server 708 of FIG. 7, multiple physical or virtual computing devices in a distributed system of a computing resource service provider, or any electronic client device such as the electronic client device 702, configured to cause the partitions 110A-10B to be placed on storage devices in a distributed computing system according to a set of rules (i.e., constraints). In some embodiments, the set of placements 106 may be a set of recommendations provided to an entity in response to a request. In other implementations, the recommendation server 104 and the placement server 108 may be the same computing system; i.e., functionality of the recommendation server 104 and the placement server 108 may be combined into a single server. In these implementations, the set of placements 106 may be a set of proposals internal to (e.g., integrated with) the placement process, and the server may directly place partitions in accordance with the set of proposals without providing the set of placements 106 to an external entity. The placement server 108 may be configured to receive the set of placements 106 for placement of partitions, such as the partitions 110A-10B, on one or more racks, such as the racks 112A-12B. As noted, the set of placements 106 may be sorted in an order of server suitability for a specified partition. That is, the first recommendation of the set of placements 106 may be a server determined to be the most suitable server for hosting the specified partition, the second recommendation of the set of placements 106 may be a server determined to be the next most suitable for hosting the specified partition, and so on.

The placement server 108 may be configured to attempt to place the specified partition at a location indicated by the top recommendation of the set of placements 106. If the specified partition is unable to be placed at this indicated location (e.g., if the space targeted for the specified partition was written to between the time that the recommendation was generated and the time at which the specified partition was attempted to be placed by the placement server 108), the placement server 108 may attempt to place the specified partition at the location indicated by the next best recommendation in the set of placements 106. In an unlikely situation where the placement server 108 is unable to place the specified partition with any of the recommended servers listed in the set of placements 106, the placement server 108 may request a new set of placements from the placement recommendation service 102 or the recommendation server 104. In some implementations, if the placement server 108 is unable to place the specified partition with the top recommended server listed in the set of placements 106, the placement server may be configured to request a new set of placements from the placement recommendation service 102 for the recommendation server 104. As noted, in some embodiments, when the recommendation server 104 determines its top recommended server for the placement of the specified partition, the recommendation server 104 can reserve, for a certain amount of time, space for the specified partition on the top recommended server. In this manner, attempts by the placement server 108 to place the specified partition with the top recommended server should be successful. After the certain amount of time, if the specified partition is not placed with the top recommended server, the reservation may expire and the space formerly reserved for the specified partition may be freed.

Note that in embodiments, the set of placements 106 may be generated on a per partition basis. That is, the set of placements 106 may be different for each partition of a volume. The number of placements in the set of placements 106 may vary based on implementation. For example, in some implementations there may be 10 placements in the set of placements 106. In other implementations, the set of placements 106 may only include the top recommendation. In still other implementations, the set of placements may include all servers having a server suitability score above a certain threshold.

In some embodiments, the set of placements 106 may further include a server suitability score. For example, a first most suitable server in the set of placements 106 may have a server suitability score of 0.1, a second most suitable server in the set of placements 106 may have a server suitability score of 0.01, the third most suitable server in the set of placements 106 may have a server suitability score of 0.001, etc. The server suitability score may be calculated based on a variety of factors including a number of replicas already being hosted by the server, a number of replicas of the same volume already being hosted by the server, a number of replicas being hosted by servers in the same rack as the server, a rack diversity constraint specifying that master and slave replicas should be placed in different racks, and whether the server belongs to a rack in the same network locality (see FIG. 2) as the other recommended servers. Other factors involved in the calculation of server suitability may include whether servers of the rack of which the server is a member have enough available space to host half of the replicas, the number of input/output operations per second supported by the storage devices of the server, and whether the replica of the partition being placed has been placed on another server and, consequently, what the replica pair count is between the server and the other server. These and other factors may be used in determining the server suitability score for placing the partition.

As noted, the partitions 110A-10B may be associated with a particular volume. That is, a volume may be comprised of a set of one or more partitions distributed across one or more storage devices in a distributed computing system. Furthermore, in some embodiments, volumes may be replicated for redundancy, which may mitigate against loss of data (which may also be referred to as "durability") in the event of a hardware failure or other error. For example, there may be a master volume and a slave volume; the slave volume may be a replica of the master volume, and the master volume may be a replica of the slave volume. Thus, because each volume may be divided into multiple partitions, each of the partitions may be replicas of another partition. That is, a volume consisting of 16 partitions may actually have 16 master replica partitions (also referred to as "masters") and 16 slave replica partitions (also referred to as "slaves"), for a total of 32 replicas. This denotes that every partition is effectively a replica pair.

As depicted in FIG. 1, partition 110A is illustrated to represent a master partition of the volume, and partition 110B is illustrated to represent a corresponding slave partition of the volume. As noted, the master partition 110A is a replica of the slave partition 110B, and the slave partition 110A is a replica of the master partition 110A. In other words, each member of a replica pair is a redundant copy of the same logical data that comprises the partition. That is, as noted, a volume may be a logical storage space within a data storage system in which data objects may be stored comprising one or more partitions, with each partition being a portion of data storage allocated to serve as at least a portion of logical storage for the volume, each member of replica pair may be a redundant copy of the portion of data storage of the other member. The racks 112A-12B are illustrated to represent racks of servers, such as may be found in a data center of a computing resource service provider. The racks 112A-12B may include equipment for providing power, cooling, and network resources to servers in the racks 112A-12B. Each rack may host a set of servers. For example, one rack may hold up to 38 servers. Each server may host a set of storage devices (e.g., hard drives, tape drives, optical drives, solid-state devices, etc.). Each of the storage devices may have space for hosting one or more partitions, such as the partitions 110A-10B.

Because the data in a volume may be distributed over multiple partitions, if one of the partitions fails, the entire volume may be lost. Thus, the more partitions there are in a volume, the greater the likelihood that one of the partitions will fail. However, because the partitions are replicated, if a partition of a volume fails, the replica partition may be used to reconstruct the failed partition. For example, if a partition in a master volume fails, the system may be configured to automatically switch the slave volume to be the master volume, and then replicate the partition in the (former) slave volume corresponding to the failed partition of the (former) master volume to a new partition, thereby reconstructing the (former) master volume.

A similar risk is a risk to volume availability. In some examples, "availability" may refer to the ability of a customer, user, application, or other entity to access the volume. For example, even if all replicated partitions are operational, because the partitions may be distributed among multiple devices, a network or other communications failure may cause the partitions to be inaccessible to entities attempting to access them. For example, if a volume has 16 partitions which are stored on various devices located in 10 different racks, should one of the racks experience a network failure, the likelihood of the entire volume being inaccessible is high. However, if the volume has 16 partitions (i.e., 32 replicas) which are all located on devices in a single rack, should that rack experience a network or other failure, both the master and slave replicas will be inaccessible. Thus, in embodiments of the present disclosure it may be desirable to distribute the partitions such that partition replica pairs are distributed between two different racks, so that should one rack experience a failure, it will only affect one half of the replica pair, allowing the other half of the replica pair to be reconstructed. In some examples, a "rack diversity" constraint may refer to isolating each replica of a partition replica pair to servers of different racks; i.e., a master partition may be allocated to a server of a first rack and its corresponding slave replica may be allocated to a server of a second rack, different from the first rack.

In some embodiments, this "hard" rack diversity constraint may further include a "soft" rack diversity constraint that has a goal to distribute all replicas of a particular volume between a minimum number of racks (e.g., two). Minimizing the number of racks reduces the risk that both a rack hosting a master replica and a rack hosting a corresponding slave replica become unresponsive due to a correlated failure. In some examples, "correlated failure" may refer to the occurrence of multiple devices being unavailable at the same time (e.g., due to hardware failure, power failure, network failure, denial of service attack, etc.). For example, if server A experiences a hard drive failure, and, while it is offline being repaired, server B also experiences a hard drive failure, the failures of servers A and B can be said to be correlated. Therefore, embodiments of the present disclosure may be configured to distribute replica pair partitions between two racks. In some embodiments, the set of placements 106 on where to place replicas are received in response to calls to application programming interfaces GetMasters( ) and GetSlaves( ).

The application programming interface GetMasters( ) may respond with placements (e.g., ten recommendations, arranged in an order from best to least best) for servers upon which to place master replicas. Parameters for GetMasters( ) may include the volume size and volume input/output operations per second requirements. The application programming interface GetSlaves( ), when passed identities of servers selected for the master replicas, may respond with placements (e.g., ten recommendations arranged in an order from best to least best) for servers to place the slave replicas. Thus, GetSlaves( ) parameters may include volume size, volume input/output operations per second, and a location of the master, and the response to the GetSlaves( ) call will have a recommendation for slave replica placement such that the slave replica is not placed on the same server or in the same rack as the master, while still maintaining rack diversity.

In embodiments of the present disclosure, rack diversity may specify that a slave should be placed on a server in a different rack than the rack that has been recommended for placement of its corresponding master. The state including information about which rack is being used for a master partition, based on the top recommendation provided by GetMasters( ) may be saved, and this state information may be referenced by GetSlaves( ) in order to generate the set of placements 106 to ensure that the slaves are not placed in the same rack as their corresponding masters, and to ensure that the rack diversity constraint is maintained; e.g., that master and slave replica placements are restricted to servers in two racks.

As an example of an embodiment, for a number of partitions 1 through X for a particular volume, the call:

GetMasters(Partition$_1$, X);

Where Partition$_1$ refers to a first master partition of X partitions, may result in a response listing one or more recommended servers for placement of Partition':

[Server$_{8,2}$, Server$_{6,8}$, Server$_{2,9}$, Server$_{1,9}$, Server$_{7,1}$]

In the example, the servers are described in a format of Server$_{R,S}$, where R represents the identity of the rack, and S represents the identity of the server within the respective rack. Thus, the first recommendation, Server$_{8,2}$, may refer to the second server in the eighth rack. The set of placements 106 may be ordered in an order of preference. For example, the first recommendation, Server$_{8,2}$, may be the server that was determined to be the best server for placement for Partition$_1$. The second recommendation, Server$_{6,8}$, may be the next best server for placement of Partition$_1$, and so on. A state reflecting at least a portion of the set of placements 106, may be saved; such as a state that saves the first recommendation. The subsequent call of:

GetMasters(Partition$_2$, X);

Where Partition$_2$ refers to a second master partition out of X partitions may result in a response listing one or more recommended servers for placement of Partition$_2$:

[Server$_{6,3}$, Server$_{9,5}$, Server$_{8,1}$, Server$_{8,8}$, Server$_{7,5}$]

The subsequent call of:

GetMasters(Partition$_3$, X);

Where Partition$_3$ refers to a third master partition out of X partitions may result in a response listing one or more recommended servers for placement of Partition$_2$:

[Server$_{6,8}$, Server$_{6,5}$, Server$_{8,6}$, Server$_{8,8}$, Server$_{8,9}$]

Note that the above placements for Partition$_3$ have been restricted to servers in racks eight and six. This reflects that the first recommendation for Partition$_1$ was the server in rack eight and the first recommendation for Partition$_2$ was in rack six, Thus GetMasters( ) may operate on the assumption that the first recommendation (i.e., the server determined to be the most suitable for the specified partition) in the sets of placements for Partition$_1$ and Partition$_2$ will be taken, and thereafter, for racks three through N, GetMasters( ) may prefer recommending servers from either rack eight or rack six, thereby maintaining the rack diversity constraint of two racks. Likewise, the GetSlaves( ) application programming interface call may also operate on the assumption that the first placements in the sets of placements for the master partition replicas were taken and make placement recommendation for the slave partition replicas in conformity with the rack diversity constraint as well.

Thus, a call to GetSlaves may take a form such as:

GetSlaves(Partition$_1$, X);

Where Partition$_1$ refers to a first slave partition replica of X partitions. The GetSlaves( ) application programming interface may obtain the state information about previously provided recommendations and may provide a recommendation for the first slave partition. For example, GetSlaves( ) may, for a slave partition replica of the particular volume, obtain the identities of the racks hosting the top servers recommended in all of the previous placement recommendations for partitions of the particular volume. From this list of rack identities, GetSlaves( ) may exclude the rack of the top server that was recommended for the master partition replica corresponding to the slave partition replica. The server recommendations for the slave partition replica then may look something like:

[Server$_{6,7}$, Server$_{6,8}$, Server$_{6,2}$, Server$_{6,9}$, Server$_{6,7}$]

Note that the above placements for Partition$_1$ have been restricted to servers in rack six. This is due to the rack diversity constraint excluding rack eight from the recommendations because the top recommendation for placement of first master partition replica was in rack eight (i.e., because we want to avoid placing the slave partition replica in the same rack as its corresponding master partition replica), and also because rack six was determined, based on the previous recommendations, to be the alternate rack to rack eight for replica placement for the volume. Note that, in some implementations master partitions may be actually placed before GetSlaves( ) is called. In such implementations, the state information indicating the actual placement locations may be used instead of the top recommended placements. In this manner, in the event a master partition replica was unable to be placed at its top recommended placement location, GetSlaves( ) can ensure that its corresponding slave partition replica is not accidentally placed on a server in the same rack as the master partition replica.

In cases where master partition replicas are placed on servers in multiple racks, such as where master partition replicas are placed without regard to state information or where the top recommended server for a master partition replica was unavailable and the master partition replica had to be placed with a server in still another (e.g., third, fourth, etc.) rack, the server recommendations for the first slave partition replica may reflect the diversity of racks where the master partition replicas are distributed. For example, in a case where master partitions are distributed over three racks, and the first master partition replica was placed with its third recommended server, Server$_{2,9}$, instead of its first and second recommended servers, the second master partition replica was placed with its second recommended server, Server$_{9,5}$, and the third master partition replica was still placed with its top recommended server, Server$_{6,8}$, a call to GetSlaves(Partition$_1$, X) may instead look something like:

[Server$_{6,8}$, Server$_{9,6}$, Server$_{6,12}$, Server$_{6,3}$, Server$_{9,4}$]

Note that, in this example all servers from racks two are excluded and the server recommendations for the first slave partition are selected from racks nine and six (i.e., the placement locations of the second master partition replica and the third master partition replica respectively). In this manner, placement recommendations for slave partition replicas may be constrained to only those racks utilized for placing the master partition replicas of the volume, thereby minimizing the number of racks of servers hosting partitions of the volume.

Note that in embodiments, while placing all partitions on only two racks is a goal, it is not mandatory. That is, in some cases, it may not be possible to restrict placement of all partitions to only two racks, and in such cases the next best placement scheme may be to have the partitions distributed among only three racks, and if that is not possible, only four racks, and so on. In some embodiments, the calls to Get-Masters( ) and GetSlaves( ) may cause storage space to be reserved at the recommended storage locations for a certain amount of time, thereby ensuring that the storage location does not get written to by some other process before the partition can be placed there. In other embodiments, the set of placements 106 do not result in the space being reserved at the recommended storage locations, but rather, if the storage location is written to by some other process before the partition can be placed there, the partition is instead placed at the storage location indicated by the next best recommendation, and so on.

In some embodiments, the set of placements 106 is made for the specified partition without consideration to the total number of partitions to be placed. In other embodiments, the set of placements 106 is made to maintain, if possible, the rack diversity, availability, and durability constraints for the total number of partitions to be placed. For example, for a volume that will have 16 partitions, the set of placements 106 may include servers from racks whose servers have sufficient room for all 16 partitions. In other embodiments, the total number of partitions to be placed additionally or alternatively may affect the set of placements 106 by limiting the placements only to include servers having types of storage devices meeting certain performance characteristics. For example, a service level agreement between the customer and the computing resource service provider may specify that a volume should support a minimum of 10,000 input/output operations per second. A determination may also be made, in this example, by the customer or by the computing resource service provider, that the volume should be comprised of eight partitions. In this example then, in order to support the minimum input/output operations per second requirement, each partition may be placed on a separate storage device that supports at least 1,250 (i.e., 10,000÷8) input/output operations per second. Therefore, the set of placements 106 for partitions of this volume may only include servers having storage devices supporting at least 1,250 input/output operations per second. Alternatively, the performance characteristics of the server storage devices may factor into the suitability score when generating the set of placements 106, such that although the set of placements 106 may include servers that do not support at least 1,250 input/output operations per second, those servers may have a suitability score reflecting that they may not be a preferred choice.

In some embodiments, an application programming interface call, such as GetMasters( ) may return a set of placements for a single specified master partition. That is, for a volume having 16 partitions, there may be 16 GetMasters( ) application programming interface calls (one for each master partition) and 16 GetSlaves( ) application programming interface calls (one for each slave partition) to obtain placements for placing all of the partitions. In other additional or alternative embodiments, an application programming interface call may return sets of placements in a batch for some or all masters of a volume. For example, the sets of placements may include a first set of placements for a first master partition, a second set of placements for second master partition (with the assumption that the top recommendation of the first set of placements will be selected for the first master partition), a third set of placements for third master partition (with the assumption that the top recommendations of the first and second set of recommendations will be selected for the first and second master partitions respectively), and so on. In some embodiments, the sets of placements also include sets of placements for the slave partitions. For example, the sets of placements may include the first set of placements for the first master partition, a first set of placements for a first slave partition corresponding to the first master partition, a second set of placements for the second master partition, a second set of placements for a second slave partition corresponding to the second master partition, and so on.

Note that other types of constraints may be utilized in determining placements in addition to or alternative to rack diversity constraints. That is, it is contemplated in the present disclosure that constraints could be based on other factors, such as different rooms in a data center, different data centers, different backup generators, different geographic locations, different power distribution units, or different automatic transfer switches. For example, instead of the rack diversity constraint, in an implementation the replica pairs may be preferably distributed evenly between servers of two different rooms of servers in a data center, in a similar manner as described above regarding distributing replica pairs between two different racks.

Figure 2:
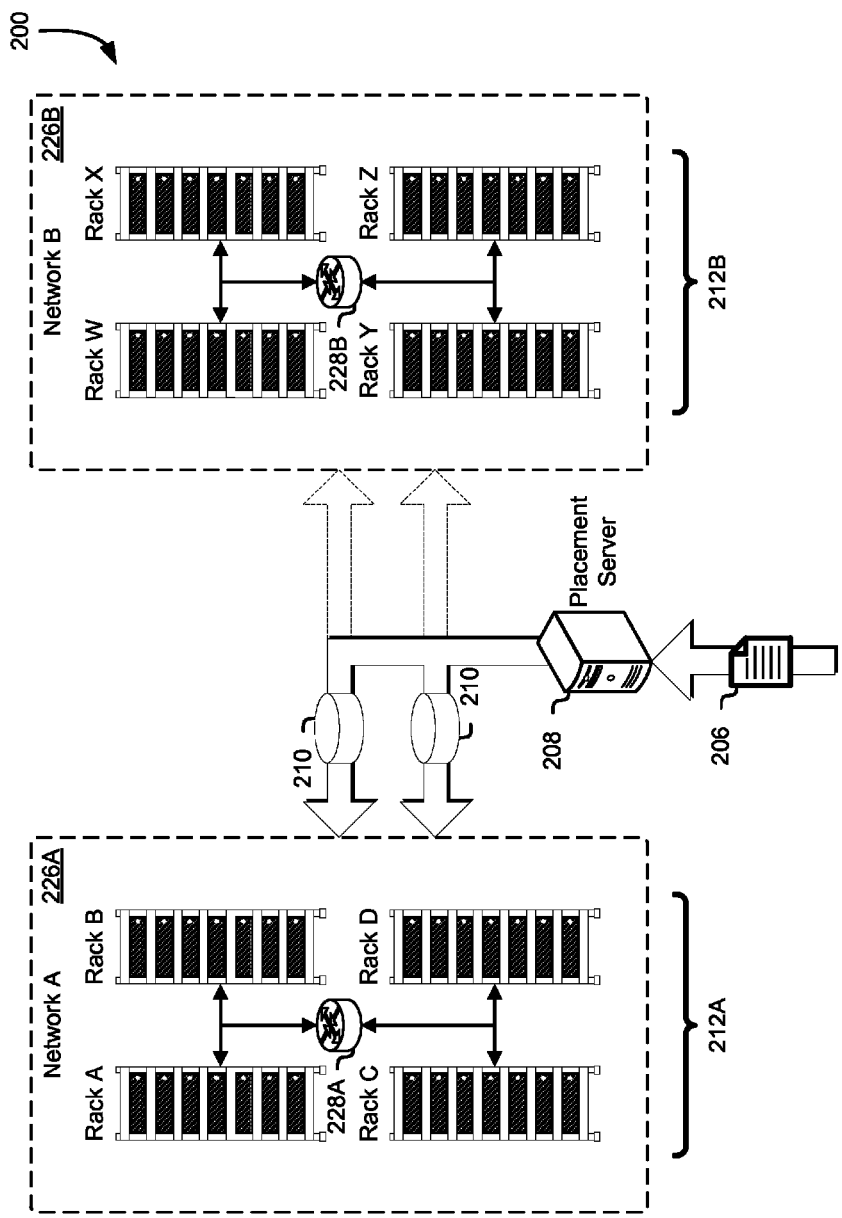
FIG. 2 illustrates an example of a network locality constraint in accordance with an embodiment.

FIG. 2 illustrates an aspect of an environment 200 in which an embodiment may be practiced. Specifically, FIG. 2 depicts an effect of rack network locality on recommendations and partition placement. The environment 200 may include a placement server 208 that receives one or more sets of placements 206 for placing partitions 210 on servers in the sets of racks 212A-12B according to a rack diversity constraint, where the sets of racks 212 may be localized by different networks 226A-26B. The set of placements 206 may be a list of servers recommended for placement of a specified partition, such as the set of placements 106 described in conjunction with FIG. 1. The placement server 208 may be a computing system of one or more computing systems configured to attempt to place partitions on servers identified in the set of placements 206, such as the placement server 108 described in conjunction with FIG. 1. The partitions 210 may be specified partitions of a volume being placed by the placement server 208 in accordance with the set of placements 206.

The sets of racks 212A-12B may be physical hardware configured to host one or more servers, or, in some embodiments, may simply be logical groupings of the one or more servers, such as the sets of racks 112A-12B of FIG. 1. Examples of logical groupings other than by rack may include servers grouped together based on data center location, servers in different fault isolation groups (i.e., logical divisions of resources such that failure of one fault zone may not affect servers in the other zones; e.g., grouped by geographic regions, data centers, hard drive clusters, backup generators, etc.), servers grouped together based on performance characteristics (e.g., throughput, input/output operations per second, etc.), and so on). The servers in a rack may be members of a particular network. In some implementations, multiple racks of servers may be members of the same network. For example, as illustrated in FIG. 2, the servers of the set of racks 212A share the network 226A. Likewise, the servers of the set of racks 212B share the network 226B.

The networks 226A-26B may be data communication pathways between one or more electronic devices. The networks 226A-26B may be wired or wireless networks and may use any of a variety of communications protocols for organizing their network traffic. The networks 226A-26B may allow the sharing of files, data, and other types of information between the one or more electronic devices accessible through the data communication pathways. Each of the networks 226A-26B may be associated with a router, such as an aggregation router that aggregates the servers of the respective set of racks into the common network, separate from the router associated with the other network. Each of the networks 226A-26B may be on a different subnet than the other network. For example, as illustrated in FIG. 2, the servers of the set of racks 212A may be commonly connected to a router 228A. Similarly, the servers of the set of racks 212B may be commonly connected to a router 228B. The routers 228A-28B may be networking devices that forward packets between computer networks, such as between the networks 226A-26B.

In terms of placement recommendation, a rack diversity constraint may specify that placements should be weighted to prefer servers within the same network locality as a physical host of one or more virtual machine instances to which the volume of the partitions 210 may be attached. For example, as shown in FIG. 2, the set of placements 206 for placing the one or more partitions 210 is received by the placement server 208. Based on the received set of placements, the placement server 208 can be seen to cause the one or more partitions to be placed on servers in the network 226A (which may be same the network of a set of virtual machine instance to which the volume will be attached). In this manner, the one or more partitions 210 are placed on servers within the same network, rather than distributed among different networks. By constraining the partitions for a volume to servers within a single network, performance degradation due to having to route data for a volume between multiple networks may be avoided.

Note, in some cases, partitions of a volume may not be able to be placed within in the same network as the virtual machine instances to which the volume will be attached (for example, there may be no servers are available in the network for hosting the partitions). The network locality constraint may be configured such that, in these cases, the partitions should be placed in different networks from each other. In this manner, because since performance, while still sufficient, may already be less than optimal due to routing data between multiple networks, by placing the replica pairs in different networks, durability of the volume is improved. That is, volume may still be accessible even in an event where one of the networks becomes inaccessible.

At times, a partition may be placed in a location that is not ideal. For example, during an initial placement it may be that a placement server, such as the placement server 108 or the placement server 208, was unable to place the specified partition in an optimal location; for example there may not have been enough room on servers of two racks, and one or more partitions may have consequently been placed on a server in a third rack. In another scenario, a server or storage device may have experienced a failure, which may have resulted in a replica partition being recreated in a less than ideal location, such as a server in a third rack. In some implementations, after the partitions are initially placed, optimization sweeps of the partitions may be performed periodically (e.g., every five minutes, once per week, etc.), according to some schedule, or in response to the occurrence of an event (e.g., failure of a server or storage device, etc.) to compensate for such less than ideal placements. In some examples, a partition placement optimization "sweep" may refer to a process that assesses whether currently-placed volume partitions are in compliance with partition placement constraints (e.g., rack diversity constraints, server pair diversity constraints, etc., as described in the present disclosure) currently in effect, determines whether currently-placed partitions can be re-organized to be brought into closer compliance with such partition placement constraints, and, if so, reorganizes the currently-placed partitions based on the partition placement constraints.

For example if a sweep of a set of partitions for a given volume are distributed among three or more racks, the sweep may attempt to consolidate the set of partitions onto only two racks or at least onto as few racks as possible while still maintaining the rack diversity constraint in force. Specifically, if most of the partitions of the set of partitions are located on two racks, but some outlier partitions are located on one or more racks other than the two racks, a placement system, which may be a placement server as described in the present disclosure, may determine if it is possible to move the outlier partitions onto one of the two racks while still maintaining a rack diversity constraint (e.g., splitting replica pairs between the two racks) and/or maintaining server pair diversity (e.g., minimizing the replica pair count per server pair). Partitions sweeps may also search for cases where, for any of a number of reasons, both members of a replica pair are on servers within the same rack, and for any of these cases, the placement system may attempt to split the replica pairs between two racks to ensure that rack diversity is maintained.

Figure 3:
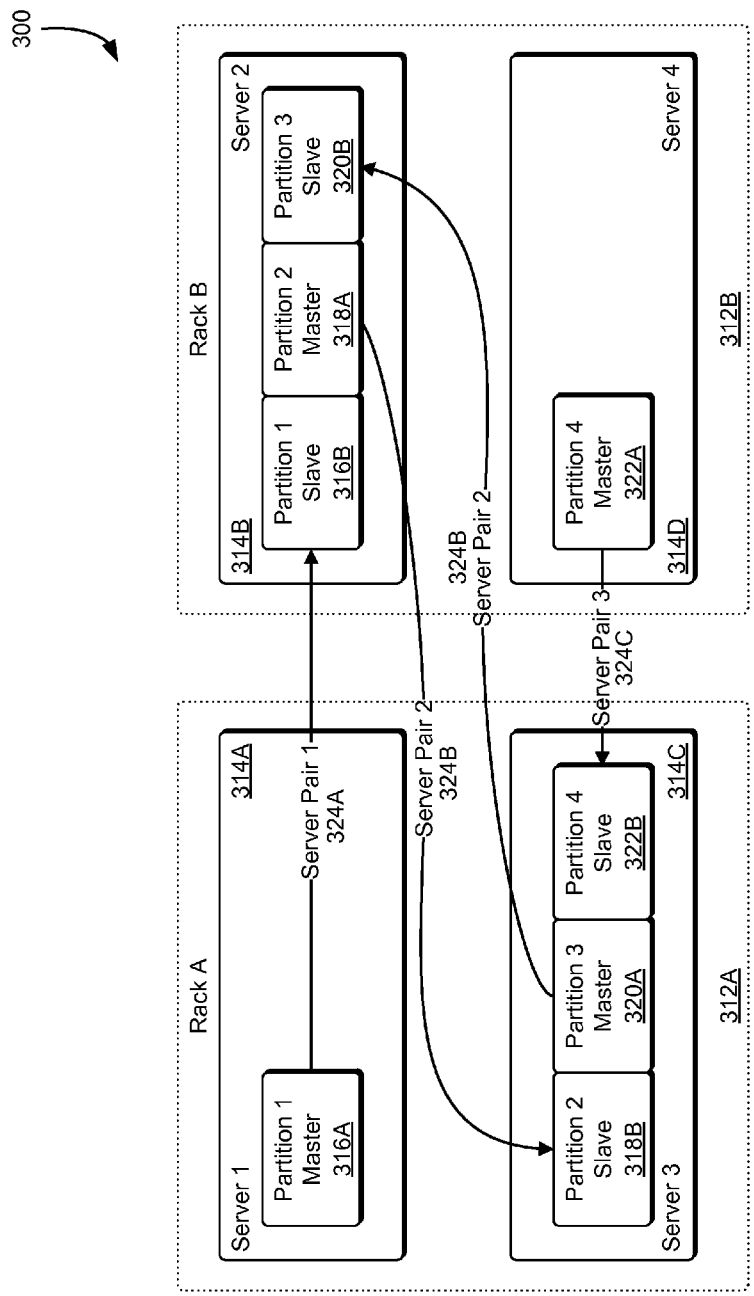
FIG. 3 illustrates an example of replica pair counts and server pairs in accordance with an embodiment.

FIG. 3 illustrates an aspect of an environment 300 in which an embodiment may be practiced. Specifically, FIG. 3 depicts partitions 316A-16B, 318A-18B, 320A-20B, and 322A-22B distributed among servers 314A-14D between two racks 312A-12B to illustrate partition placement for server pair diversity. The racks 312A-12B may be racks similar to the racks 112A-12B described in conjunction with FIG. 1. Although illustrated as having only two servers each (314A/14C and 314B/14D), this is for illustration purposes only and the racks 312A-12B may host any number of servers. Furthermore, not all implementations may have actual physical racks. Instead, in some implementations the elements depicted as racks 312A-12B may simply be groupings of servers. The groupings of servers may share a common power source, share the same network, be located in the same room of the data center, or may be grouped according to some other scheme. The servers may therefore be any of a variety of types of servers, including but not limited to rack-mounted servers. The physical hardware of the servers may include such hardware as would be sufficient to provide corresponding services, such as data storage services, to customers of the computing resource service provider (such as the server hardware described in conjunction with FIG. 7). The servers may each have a set of data storage devices, such as a hard drive array, for storing partitions of volumes.

A server hosting a master partition and a server hosting a slave partition corresponding to the master partition comprise a server pair. In some embodiments, a placement strategy may be to keep the number of replica pairs shared between server pairs to a minimum. In the environment 300, a request has been received to place the first partition replica pair. Consequently, a first partition master 316A has been placed on a first server 314A and its corresponding first partition slave 316B has been placed on a second server 314B. Next, a second partition replica pair is placed; a second partition master 318A is placed on the second server 314B and its corresponding second partition slave 318B has been placed on a third server 314C. Thus, in this illustration, the servers 314A/314B hosting the first partition replica pair form a first server pair 324A. The servers 314B/314C hosting the second partition replica pair form a second server pair 324B. Next, a third partition replica pair is placed; a third partition master 320A is placed on the third server 314C and its corresponding third partition slave 320B is placed on the second server 314B. This third partition replica pair consequently utilizes the same server pair as the second partition replica pair (i.e., 314B/314C). Finally, a fourth partition replica pair is placed; a fourth partition master 322A is placed on a fourth server 314D and its corresponding fourth partition slave 322B is placed on the third server 314C. Thus, the servers 314C/314D hosting the fourth partition replica pair form a third server pair 324C.

As noted, in some embodiments a partition strategy may, in addition to following rack diversity, availability, and durability constraints, include keeping server pair counts low. As can be seen, the server pair count for the first server pair 324A is one; that is, there is only one partition replica pair (316A-16B) shared between the first server pair 324A. On the other hand, the server pair count for the second server pair 324B is two; that is there are two partition replica pairs (318A-18B and 320A-20B) shared between the second server pair 324B. The server pair count for the third server pair 324C is one, because there is only one partition replica pair (322A-22B) shared between the third server pair 324C.

In a scenario where the partitions 316A-16B, 318A-18B, 320A-20B all belong to the same volume, if there is a correlated failure of the servers 314A and 314B, or the servers 314B and 314C, or the servers 314C and 314D, the entire volume associated with partitions 316-422 be lost (because at least one partition replica pair of the volume will be lost). Thus, in some single volume cases, spreading replica pairs among as many server pairs as possible may not be preferred. That is, the greater the number of server pairs hosting the replica pairs of the volume, the greater the chance, if a correlated failure were to occur between a server pair, that a replica pair of the volume may reside on the failed server pair, thereby resulting in the loss of the entire volume. However, among multiple volumes, server pair diversity may be preferred. For example, if the first partition replica pair 316A-16B and the second partition replica pair 318A-18B belong to a first volume, and the third partition replica pair 320A-20B and the fourth partition replica pair 322A-22B belong to a second volume, it can now be seen that if the first server 314A and the second server 314B have a correlated failure, only the first volume will be lost. Likewise, if there is a correlated failure between the third server 314C and the fourth server 314D, only the second volume will be lost. Note though, because the server pair count for the second server pair 324B includes partition replica pairs from both volumes, a correlated failure between the second server 314B and the third server 314C may mean the loss of both volumes. However, overall, keeping server pair counts low may, on average, result in the loss of fewer volumes in the event of correlated failures.

Also note, that although the server pairs 324A-24C illustrated in FIG. 3 are shared between the two racks 312A-12B, each of the servers 314A-14D of the racks 312A-12B may host members of replica pairs whose counterparts reside on servers in other racks (not pictured). For example, servers in the second rack 312B may be paired with servers in a third rack for the purpose of hosting half of a replica pairs where the other halves of the replica pairs are on servers in the third rack.

An example of a low server pair count placement strategy might be, where a first server pair comprising a first server and a second server hosts three replica pairs, and a second server pair comprising the second server and a third server hosts no replica pairs, a placement strategy for another replica pair may be to recommend placement on the second server pair. Or, a more specific example may be GetMasters( ) may have already recommended to place a master partition on the first server, leaving the second server and the third server as candidates for placing a corresponding slave partition. If the slave partition is placed on the second server, the first server pair count will be incremented by one, for a total of four. In such a case, if the first server pair fails in a correlated failure, four partitions will be lost. Whereas, if the slave partition is placed on the third server, the first server pair count remains at three and the second server pair count is incremented by one to a total of one, effectively resulting, in the event the first server pair fails in a correlated failure, that at most three partitions will be lost, and, in the event the second server pair fails in a correlated failure, at most one partition will be lost. Consequently, a call to GetSlaves( ) may recommend placing the slave partition on the third server over the second server because a worst-case correlated failure would impact fewer partitions (the first server would likely not be included in the set of placements 106 due to a server diversity constraint, because the master is already placed or recommended to be placed on the first server). Thus, an overall placement strategy may be to keep the number of partition replica pairs on different server pairs to a minimum, so that in an unlikely event of multiple server failure, the number of volumes impacted is minimized. An alternate expression of the strategy may be to spread volume partitions between the most possible servers within the same rack.

To reiterate, if one replica pair of a volume partition is lost, the volume itself may be lost because it may not be possible to utilize the volume without the missing volume partition. Thus, the consequences of the loss of replica pairs for two or more volume partitions of the same volume may be the same as the loss of replica pairs for a single volume partition. However, a goal of server pair diversity may be, in some embodiments, to diversify replica pairs for the same customer between servers. That is, replica pair counts for server pairs may be performed on a customer-by-customer level so that, in a case of a correlated failure between the server pair, the number of volumes lost for a given customer affected by the correlated failure can be minimized. For example, if the server pair has a replica pair count of five, one replica pair for each of five volumes of the customer, and the server pair experiences a correlated failure, the customer is badly impacted because five of the customer's volumes may be lost. However, if the server pair of five, one replica pair for each volume of five customers, and the server pair experiences a correlated failure, although five customers are impacted, each customer only loses a single volume.

However, in some embodiments, a server pair diversity constraint may specify that it is preferable to consolidate replica pairs for a given volume on a minimum number of server pairs (i.e., minimal server pair diversity). For example, if the server pair has a replica count of five, with each replica belonging to the same volume of a customer, in a case of correlated failure between the server pair, only one volume for the customer may be lost. Thus, consolidating replica pairs for a given volume may present benefits over diversifying replica pairs for a given volume across multiple server pairs. However, from a performance standpoint, it still may be preferable to diversify replica pairs for a given volume among multiple server pairs. In an example, a first server pair (consisting of a first server and a second server) has a first partition (i.e., a master partition on one server and a slave partition on the other server) with a size of 100 gigabytes and a performance of 2,000 input/output operations per second. If a second partition (i.e., partition replica pair) is placed on the first server pair, it may negatively affect the performance of both partitions. That is, if the first partition and the second partition are part of the same volume, the partitions are likely to be active at the same time, which may reduce the input/output operations per second of both partitions. If the first partition and the second partition are partitions for separate volumes, they may be less likely to be active at the same time. On the other hand, for a system with different performance characteristics (e.g., where multiple partitions of a given volume may not negatively affect performance of the volume) or for a system where losing one partition replica does not cause the loss of an entire volume, consolidating replica pairs to a minimal number of server pairs may be preferable. Therefore, an ideal server pair diversity constraint may be a balance between performance, degree of customer impact, and number of volumes affected in the event of a correlated failure between a server pair.

The calculation of the server suitability score may be weighted to reflect this balance. For example, in generating a server suitability score for placing a slave replica partition whose corresponding master replica partitions have already been placed on the first server 314A based on server pair diversity, and where all partition replicas 316-22 belong to the same customer, the server pair 314B-14C may receive a less favorable server suitability score than the server pairs 314A-14B and 314A-14D, because the server pair 314B-14C already has a replica pair count of two, and the other server pairs only have a replica pair count of one. Alternatively, in an implementation where replica pair consolidation on a volume-by-volume basis is desired, the server pair 314B-14C may receive a more favorable server suitability score than the server pairs 314A-14B and 314A-14D, because doing so consolidates more replica pairs between the same server pairs for single volume.

On the other hand, if partition replicas 318 and 320 belong to a first customer, and partition replicas 316 and 322 belong to a second customer, in generating a server suitability score for placing master and slave replicas for the second server based on server pair diversity on a customer-by-customer basis, the server pair 314B-14C may receive a more favorable server suitability score than the server pairs 314A-14B and 314A-14D because the server pair 314B-14C currently hosts zero replica pairs for the second customer, whereas the server pairs 314A-14B and 314A-14D already each currently host one replica pair. Alternatively, in an implementation where replica pair consolidation on a volume-by-volume basis is desired, the server pair 314B-14C may receive a less favorable server suitability score than the server pairs 314A-14B and 314A-14D because doing so would consolidate fewer replica pairs between the same server pairs for single volume.

In some embodiments, there may be a balance between replica pair diversity and replica pair consolidation. For example, in an implementation, replica pair diversity specify that replica pair counts for a given volume between server pairs should be maximized up to a replica pair count threshold, and thereafter server suitability scores should reflect a preference to maximize replica pair counts between server pairs for the volume. Such as in a case where, for a single volume, replica pairs for partitions of a given volume may be distributed between a single server pair, but, once the replica pair count for the server pair exceeds 16, future replica pairs may be distributed between one or more different server pairs. In this manner, replica pairs may be stacked on a single server pair until it is determined that the impact of the number of replicas on the performance of the server pairs dictates that further server pair diversification should occur. Thus, in such an implementation, the system can attempt to minimize replica pairs between server pairs if the score being computed is between different customers or between different volumes. However, if the system is attempting to place a replica pair for the same volume on which a server pair already has some replicas of the volume, then suitability score assessment may be weighted to favor the servers of that server pair.

As another example, in an additional or alternative implementation, replica pair diversity specify that replica pair counts for a given volume between server pairs should be minimized up to a replica pair count threshold, and thereafter server suitability scores should reflect a preference to maximize replica pair counts between server pairs for the volume. Such as in a case where, for a replica pair count threshold of 16 replica partitions, once all server pairs feasible for placing a replica pair for a volume have exceeded a replica pair count of 16, new requests for placements for placing replica pairs may prefer server pairs that have larger replica pair counts. In this manner, because each server pair already has over a threshold number of replicas belonging to single volume, adding more replicas to that server pair may have less of an impact on performance of the volume than if each server pair had less than the threshold number of replicas. For example, a replica pair for the same volume placed on a server pair that already has a replica count of one, thereby increasing the replica pair count of the server pair to two, may proportionally reduce the performance of that server pair less than the proportion the performance would be reduced by placing a replica pair for the same volume on a server pair that already has a replica count of 16, thereby increasing the replica pair count of that server pair to 17. In some implementations, the computing resource service provider may allow the customer to specify the replica pair count threshold, such as through an application programming interface.

As an example scenario of a partition placement recommendation based on server pair diversity, a partition recommendation request is received, via a GetSlaves( ) application programming interface, for placing a volume and a master partition replica corresponding to the specified slave partition which has already been placed on the first server 314A of FIG. 3. In this example, if the slave partition is placed on the second server 314B, the replica pair count between the first server 314A and the second server 314B becomes two. In this case, if the first server 314A and the second server 314B experience a correlated failure, two key partitions (the partition corresponding to the first partition master 316A and the first partition slave 316B and the partition corresponding to the newly placed master and slave replicas) are lost. If both partitions belong to the same volume, only that volume will be lost, whereas if both partitions belong to separate volumes, two volumes will be lost. In the latter case if both volumes belong to the same customer, the customer will have lost two volumes. On the other hand, if both volumes belong to separate customers, then each customer will have lost one volume.

On the other hand, if the slave partition is placed on the fourth server 314D, the replica pair count between the first server 314A and the fourth server 314D becomes one, and the replica pair count between the first server 314A and the second server 314B remains at one. In this case, if the first server 314A and the second server 314B experience a correlated failure, only one key partition (the partition corresponding to the first partition master 316A and the first partition slave 316B) may be lost, meaning that only one volume and only one customer will be affected. Likewise, if the first server 314A and the fourth server 314D experience a correlated failure, the newly placed master and slave partitions may be lost, but only one volume and only one customer will likewise be affected.

After initial placement of the replica pairs, sweeps of the partitions may be made periodically or according to some other schedule, to search for cases where replica pair counts for any server pair are too high or too low. For example, if the fourth partition master 322A had been placed on the second server 314B, or had been relocated to the second server 314B (e.g., due to a temporary hardware failure associated with the fourth server 314D), a partition sweep may reveal that the replica pair count of the second server pair 324B is now three while the replica pair count of the third server pair 324C is zero. A placement system may attempt to optimize the server pairs by moving one of the partitions from the second server 314B to the fourth server 314D. For example, if either the second partition master 318A, the third partition slave 320B, or the fourth partition master 322A is moved from the second server 314B to the fourth server 314D, the partition placement would be re-optimized according to the server pair diversity constraint.

Figure 4:
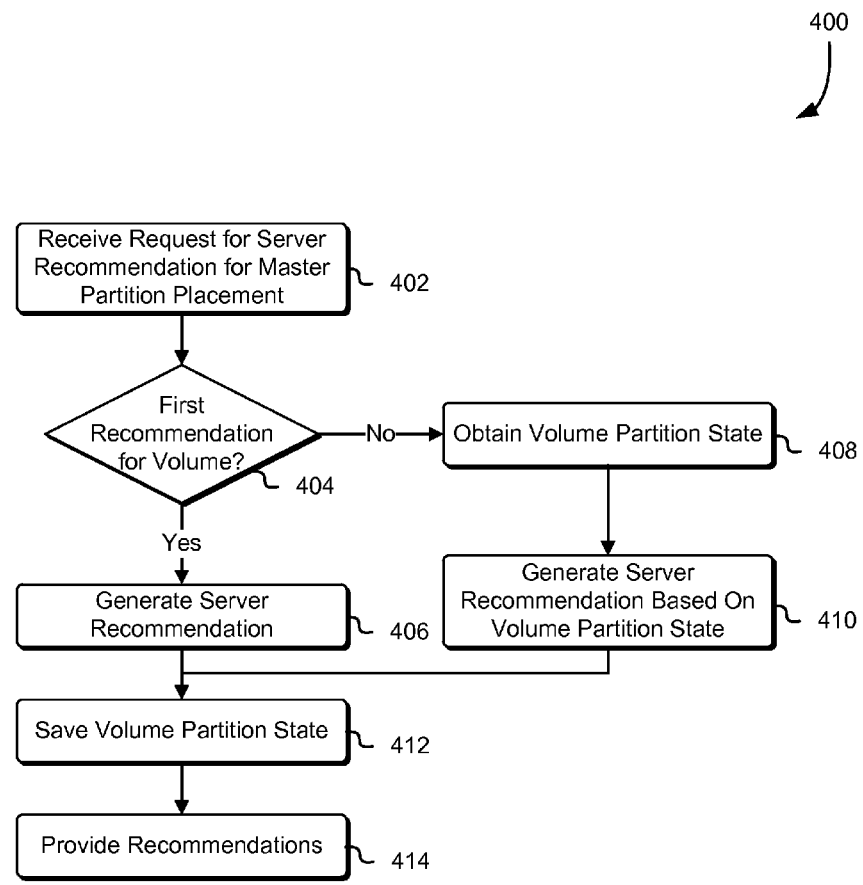
FIG. 4 is a flow chart that illustrates an example of generating recommendations for placing master replicas in accordance with an embodiment.

FIG. 4 is a flow chart illustrating an example of a process 400 for providing placements for placing master partition replicas for volumes in accordance with various embodiments. The process 400 may be performed by any suitable system such as the systems described in conjunction with the recommendations server 104 of FIG. 1. The process 400 includes a series of operations wherein a request for placing a master partition is received, a determination is made whether a volume partition state exists, and based on that determination, partition placements are generated for the specified master partition and provided.

In 402, a request is received to determine a placement location for specified master partition of a volume. In some implementations, the request will originate from a placement server such as the placement server 108 of FIG. 1. In other implementations, the request might originate from a customer of a computing resource service provider or some other entity (e.g., application, service, user, etc.) authorized to make such requests. The request may specify the master partition (e.g., an identity for the master partition, which may have already been created) or may specify characteristics of the master partition, such as a master partition size and a preferred performance of input/output operations per second or throughput. The request may also specify a total number of partitions for the volume associated with the master partition of the request; in other words, if the master partition specified in the request is one of 16 master partitions comprising the volume, the request may also pass a parameter indicating the total number of master partitions comprising the volume (i.e., 16). Depending on the particular implementation, other information that may be passed with the request could include information specifying the number of placements to generate, a preferred number of racks to distribute replica pairs between, or an identity of a network of racks or servers from which to select servers. In some implementations, the request could include specified racks from which to select servers for the placements, and a list of servers from which to select from for the recommendation.

In 404, the system performing the process 400 may determine whether the received request is the first request received to place a master partition of the particular volume or whether requests for other partitions of the particular volume have been received, and consequently state information about the placements for those volumes which may be available. If the current request is the first request for placement placements of a partition of the particular volume, the system performing the process may proceed to 406, whereupon the system may generate a set of partition placements for the master partition specified in the request. As noted, a set of partition placements may indicate one or more server upon which to place a particular partition. The set of partition placements may include identities and/or locations (e.g., network location, network address, media access control address, physical location information, etc.) of one or more servers determined to be suitable for hosting the master partition specified in the request. The set of partition placements may further include a server suitability score associated with each server and information identifying a rack or other grouping of servers to which the recommended server belongs. The server suitability score may be computed based on a variety of factors, such as an amount of available space on storage devices of the server, performance (e.g., input/output operations per second, throughput, etc.) of storage devices of the server, whether the server is currently hosting partitions of other volumes of the customer for which the current master partition is being placed, and whether other servers in the rack of the server being scored are available or have available space for storing half of the replica pairs of the volume associated with the master partition that is being placed.

Otherwise, if volume partition state information is available (e.g., if information about recommendations generated for at least one other partition of the particular volume has been saved, etc.), the system performing the process may proceed to 408, whereupon the volume partition state information may be retrieved. The volume partition state information may include information such as the top recommended server of the previous placements, all placements of the previous placements, actual placement locations of other partitions of the particular volume (if known), timestamps indicating when the placements were made or when the volume partition state information was updated, or other similar information. Note too that the volume partition state information may include information about placements and/or placement of both master and slave replica partitions associated with the particular volume.

Based on the retrieved volume partition state information, in 410, the system may generate a set of partition placements of one or more servers determined to be suitable for hosting the master partition specified in the request. The set of partition placements may further include a server suitability score associated with each server and information identifying a rack or other grouping of servers to which the recommended server belongs. As noted in the description of the operations of 406, the server suitability score may be computed based on a variety of factors listed above. However, in 410, the server suitability score, in some embodiments, may compute the server suitability score from additional factors derived from the volume partition state information. For example, based on previous partition placements (as obtained from the state information), the system performing the process 400 may generate the set of partition placements based on an assumption that the top recommended servers in the previous set of partition placements were selected for placing their respective partitions. Based on this assumption, if previous partitions for the particular volume were recommended to be placed on servers hosted by a certain two racks, the system may compute its server suitability scores more heavily weighted in favor of servers on those two racks. In a case where previous partitions for the particular volume were actually placed on servers of three or more racks, or were specified to be placed on servers of three or more racks, the server suitability scores may then be weighted more heavily in favor of servers on the specified three or more racks. Furthermore, if the distribution of the partition placements for the previous partitions is not evenly spread between the previously recommended racks or racks where the partitions were actually placed, the server suitability score computed in 410 may be weighted/adjusted to spread the partitions between the racks more evenly. For example, if five partitions of a volume have previously been recommended to be placed on servers in a first rack, and a sixth partition of the volume has previously been recommended to be placed on a second rack, the distribution can be seen to be unbalanced. In such a case, a server recommendation for the current specified master partition may be weighted to prefer servers in the second rack versus servers in the first rack.

In 412, once the set of partition placements has been generated, the volume partition state may be stored or updated to reflect the set of partition placements and/or other information (e.g., timestamps, rack identities, etc.) in the set of partition placements. As noted, the volume partition state may be updated to include the top recommended server and/or other servers in the current set of partition placements, information identifying a rack for the top recommended server or other servers in the set of partition placements, a timestamp indicating a current time that the partition placements were generated, and other such information. Note that, in some embodiments, the volume partition state is not saved. These embodiments may be implemented in various way. For example, in one implementation, the process 400 omits the operations of 404, 408, 410, and 412, resulting in a non-divergent flow from 402 to 406 to 414. In other words, each set of partition placements may be generated without knowledge of previous recommendations or previous placements. Another example implementation, process 400 omits the operations of 408 and 412, and, if, in 404, the received request is not the first request, the system performing the process 400 may proceed directly to 410. Then, in 410, rather than use volume partition state information reflecting previously provided sets of partition placements, the server recommendations of 406 may query a volume table or other data structure storing data about the actual locations of placed partitions, and the set of partition placements generated in 410 may be generated based at least in part on the actual locations of placed partitions.

Finally, in 414, the set of partition placements may be provided. In some implementations, the set of partition placements may be provided to the requestor of 402. In other implementations, the set of partition placements may be provided to a placement server, such as the placement server 108 of FIG. 1, if the placement server was not the requester of 402. In other words, the request may originate from an entity other than a placement server such as from a customer of a computing resource service provider through an application programming interface requesting to place one or more partitions of the customer's volume. In such a case, the application programming interface may cause the request to be made to the system performing the process 400, and the system performing the process 400 may automatically provide the generated placements to a placement server to place the partitions according to the generated placements in response to the customer request. Note that one or more of the operations performed in 402-14 may be performed in various orders and combinations, including in parallel.

Figure 5:
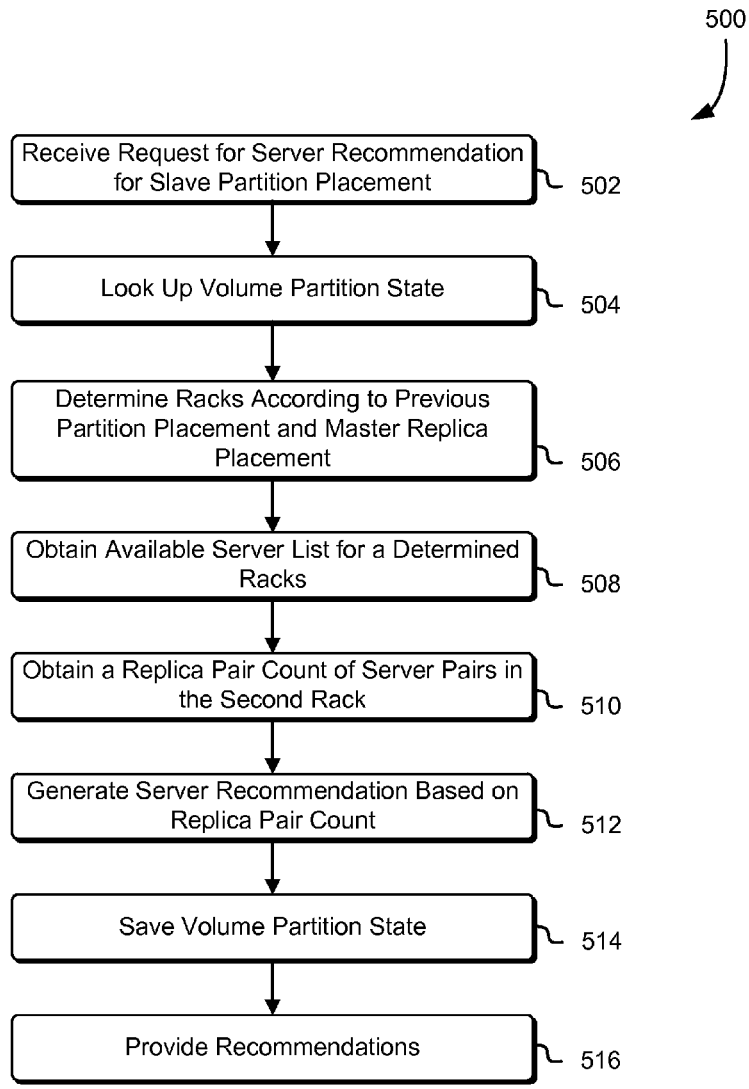
FIG. 5 is a block diagram that illustrates an example of generating recommendations for placing slave replicas in accordance with an embodiment.

FIG. 5 is a block diagram illustrating an example of a process 500 for providing placements for placing slave partition replicas for volumes in accordance with various embodiments. The process 500 may be performed by any suitable system such as the systems described in conjunction with the recommendation server 104 of FIG. 1. The process 500 includes a series of operations wherein a request for placing a slave partition is received, the volume partition state of the volume partitions is obtained, a determination of servers in which racks is made based on the volume partition state, and replica pair counts of the volume between server pairs is computed. Based on the volume partition state and the replica pair counts, a set of partition placements for the specified slave partition is generated and provided.

In 502, a request is received to determine a placement location for specified slave partition of a volume. Although it is contemplated in the scope of the present disclosure, that in some implementations placements for slave partition may be requested and obtained before placements for a corresponding master partition, the process 500 illustrates an embodiment where a master partition replica of the slave partition has already received placements and/or been placed. It should also be noted, that in many embodiments it is not necessary to first get placements for all of the master partition replicas of a volume before getting placements for the slave partition replicas of a volume; that is, in many embodiments, placements between master partition replicas and slave partition replicas may be generated and obtained in any order including alternating order. Furthermore, it should be noted that although a volume may comprise partitions in a particular order (e.g., a second partition follows the first partition, a third partition follows the second partition, etc.), is contemplated that replication and placement of the partitions do not have to follow the particular order the partitions fall in the volume. For example, for a 16 partition volume, a recommendation request for the fifth partition may be made first, a recommendation request for the $16^{th}$ partition may be made second recommendation request for the ninth partition may be made third, etc.

Similar to the process 400, in some implementations the request of 502 may originate from a placement server such as the placement server 108 of FIG. 1, and in other implementations, the request might originate from a customer or some other entity. The request of 502 may also specify the total number of partitions for the volume associated with the slave partition of the request. And other information that may be included in the request may be information specifying the number of placements in the generated set of placements, and a maximum replica pair count for any given server pair hosting replica partitions.

In 504, the system performing the process 500 may retrieve the volume partition state information. As described in the description of the process 400, the volume partition state information may include information such as the top recommended server in previous sets of placements or, alternatively, all recommended servers of the previous placements, actual placement locations of partitions for the volume, timestamps for previous placements, or other similar information. In 506, based on the volume partition state information and a rack diversity constraint (e.g., attempt to avoid placing the slave partition within the same rack as its corresponding master partition), one or more racks may be determined from which to select servers for the set of placements to be generated. For example, if a master partition that is a replica of the slave partition specified in the request of 502 have been placed on a first rack and the diversity constraint is to attempt to keep partitions on servers within two racks without both replicas of a replica pair being within the same rack, a second rack different from the first rack may be determined for placing the slave partition. Therefore, in 508, a list of servers from the determined rack or racks (e.g., the second rack) capable of hosting the specified slave partition may be obtained. Note that the list of servers may be obtained in a variety of ways, such as with reference to a mapping of servers hosted by that rack stored in a table or other data structure accessible to the system performing the process 500.

In 510, for each server in the list of servers, the system performing the process 500 may count the replica pairs (described in more detail in the description of FIG. 3) shared between that server and another server (server pairs). Such server pairs with lower replica counts may be weighted more favorably in a server suitability score. In some implementations, only replica pairs associated with the volume of the specified slave partition are considered in the counts, whereas in other implementations all such replica pairs are count. In still other implementations, only replica pairs between the server under consideration and servers in the same rack as the corresponding master partition are considered in the counts.

In 512, based on the server list obtained in 508 and the replica pair counts obtained in 510, a server suitability score may be computed. Based on the server suitability score, the set of partition placements for the specified slave partition may be generated. As noted, in some implementations only the top server recommendation (e.g., the server having the most favorable server suitability score) may be generated for the set, while in other implementations a fixed number of partition placements (e.g., ten, five, fourteen, etc.) may be generated for the set. In still other implementations, the requestor of 502 may specify a number of partition placements to be included in the set, and, in even other implementations, the set of partition placements may include all servers from the server list of 508 capable of supporting placement of the specified slave partition ordered by their respective server suitability scores. In yet another implementation, the set of partition placements may include all servers whose server suitability score is above or below a threshold.

In 514, once the set of partition placements have been generated, the volume partition state may be updated to reflect the set of partition placements, other information in the set of partition placements (e.g., timestamps, rack identities, etc.) and/or other relevant information. As noted the volume partition state may be updated to include the top recommended server and/or other servers in the current set of partition placements, information identifying a rack for said servers, timestamps indicating the time at which the partition placements were generated, and other such information.

Lastly, in 516, the set of partition placements may be provided. Similar to 414 of the process 400 of FIG. 4, in some implementations, the set of partition placements may be provided to the requester of 502. In other implementations, the set of partition placements may be provided to a placement server, such as the placement server 108 of FIG. 1 (if the placement server was not the requester of 502). Note that one or more of the operations performed in 502-16 may be performed in various orders and combinations, including in parallel.

Figure 6:
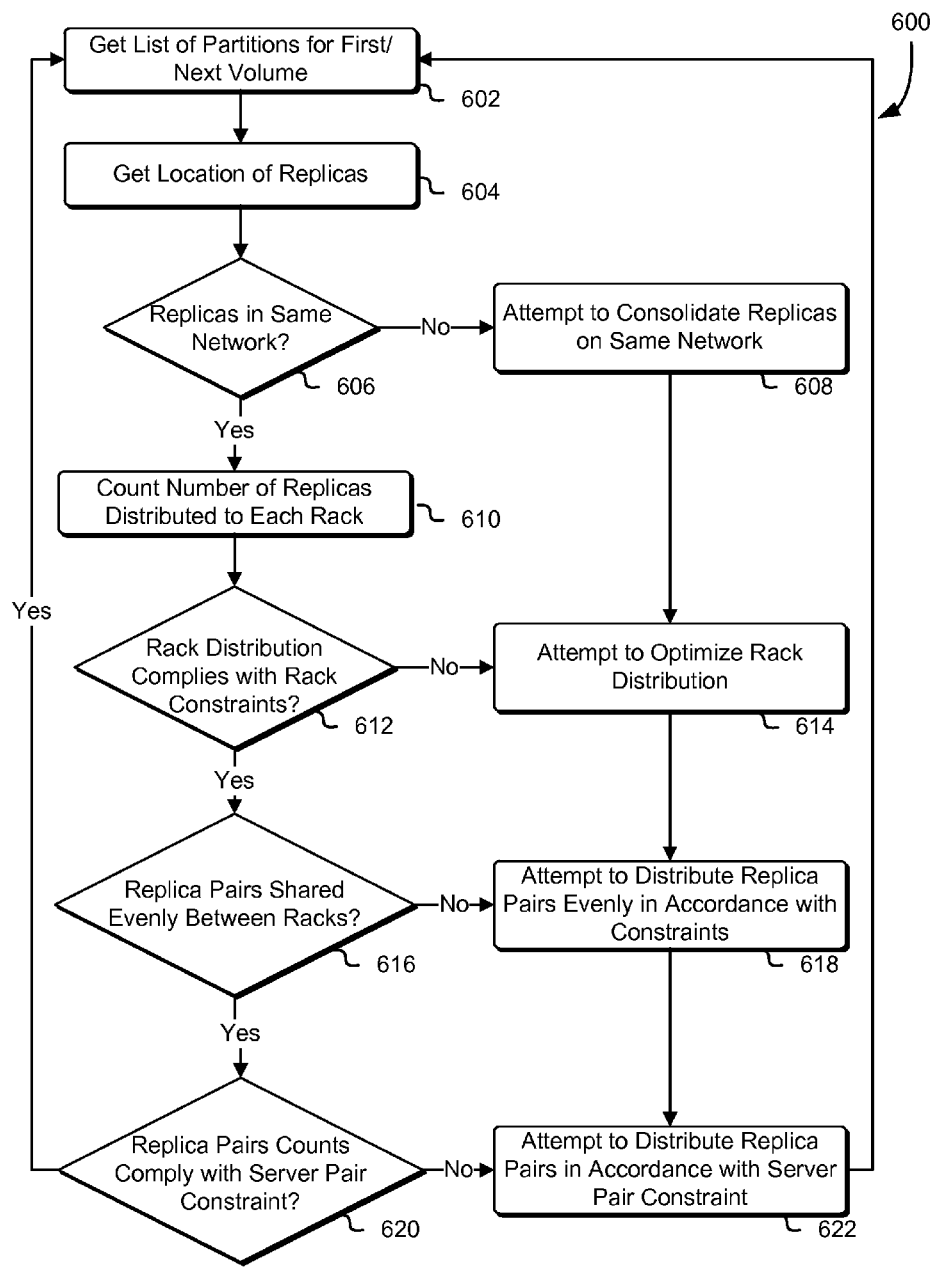
FIG. 6 is a flow chart that illustrates an example of performing a partition placement optimization sweep in accordance with an embodiment.

FIG. 6 is a flow chart illustrating an example of a process 600 for re-optimizing replica placement in accordance with various embodiments. The process 600 may be performed by any suitable system such as a server in a data center, multiple computing devices in a distributed system of a computing resource service provider, or any electronic client device such as the electronic client device 702 described in conjunction with FIG. 7. The process 600 includes a series of operations wherein partition placements for volumes are analyzed, and, if out of compliance with a current set of constraints, attempts are made to re-place partitions such that they are in compliance with the current set of constraint. The process 600 may be described as a partition placement optimization sweep (or referred to in the present disclosure as "optimization sweep" or "sweep" for simplification purposes).

As noted, for various reasons replicas may not always end up being placed in accordance with their respective recommended placements. As well, even if replicas are placed according to recommended placements, over time replicas and servers may be moved about such that the replica distribution may no longer comply with the rack diversity constraint, server pair constraint, or some other constraint. Furthermore, over time, determinations may be made to make changes to the constraints, resulting in replica distribution that was compliant according to previous constraints now being noncompliant with the current constraints. The process 600 depicted in FIG. 6 is intended to be illustrative of different types of constraints that may be active in an embodiment of the present disclosure. Note that not all of these constraints may be present in every embodiment. Also, note that in various embodiments, other constraints may be implemented additionally or alternatively to the constraints described and depicted in FIG. 6.

In 602, a list of partitions for a particular volume is obtained. Note that while the embodiment of process 600 in FIG. 6 is depicted as being performed on a volume-by-volume basis, is contemplated that a partition placement optimization sweep need not necessarily be performed on a volume-by-volume basis. For example, a partition placement optimization sweep may be performed on a server by server basis, may be performed on all partitions hosted by a computing resource service provider in any order, may be performed on a rack by rack basis, or some other basis. The list of partitions for the volume may be obtained from a master list stored in a data structure and accessible by the system performing the process 600. The list of partitions may include both slave and master replica partitions.

In 604, for the volume, the server locations of the replica pairs are obtained, the replica pairs being the master partitions that comprise the volume and their corresponding slave partitions that comprise the replicated volume. Then, in 606, the system performing the process 600 determines whether, based on the server locations of the replicas (i.e., master and slave partitions) obtained in 604, all replica pairs reside on servers in racks within the same network. Detailed description of racks within the same or different networks can be found in the description of FIG. 2. If one or more replicas reside on a server in a different network than other replicas, the system performing the process 600 may proceed to 608.

In 608, the system may execute a process that attempts to consolidate all replicas to servers within the same network. The process 600 is illustrated to show that the system performing the process 600 then proceeds to perform the operations of 614, followed by the operations of 618, and followed by the operations of 622. However, in actual implementation, the operations of 614, 618, and 622 may be integrated with the operations of 608, and not performed separately. In other words, rather than a replica first being moved to be on the same network in 608, then moved again to meet rack diversity constraints in 614, then moved again to evenly distribute replica pairs, and so on, a replica may be moved to be on the same network to a location that meets the rack diversity constraints of 614, the constraints of 618, and the constraints of 622.

Otherwise, if the replicas are in the same network, the system performing the process 600 may proceed to 610, whereupon the number of racks having servers hosting replicas of the particular volume are counted in the number of replicas on servers in each of those racks are counted. In 612, the system performing the process 600 may determine whether the number of racks utilized to host the volume can be further minimized. For example, if a goal of a rack constraint specifies that replicas of the same volume should be distributed between two racks, and a count of racks with servers actually hosting the replicas reveals that the replicas are spread among three racks, the count of racks would not meet the specified rack constraint. Similarly, if a master and corresponding slave replica were found to be hosted by servers on a single rack, this too would not meet a rack diversity constraint. Thus, if the racks with servers hosting the replicas does not meet rack constraints the system performing the process 600 may proceed to 614, whereupon the system may attempt to reorganize the replicas of the volume to meet the rack constraints. For example, in the above case where the count of racks reveals that the replicas are shared between three racks, replicas hosted by servers on a third rack may be moved to be distributed between the other two if the other two are capable of hosting all of the replicas of the volume. However, it is understood that such rack constraint may be a soft constraint (i.e., is not necessarily mandatory); for example, if the servers on the other two racks have insufficient space or other resources to support the replicas being hosted by the servers on the third rack, the system may determine to leave the replicas on the third rack alone. Thus, it may be that the system performing the process 600 may simply attempt to find the closest fit to the rack constraint. Note too, that like the operations of 608, if the number of replicas distributed to each rack need to be reorganized to meet the rack constraint, the operations of 618 and 622 may be integrated with the reorganization of the replicas rather than being performed separately or in isolation.

Otherwise, if, in 612, the count of racks with servers hosting replicas is determined to meet the rack constraints, in 616, the system performing the process 600 may determine whether the replica pairs are evenly shared between racks. That is, one of the constraints may be that both a master replica and its corresponding slave replica should not be within the same rack (e.g., or as noted, in some implementations, within the same logical grouping of servers, such as servers grouped together based on data center location, servers in different fault isolation groups (i.e., logical divisions of resources such that failure of one fault zone may not affect servers in the other zones; e.g., grouped by geographic regions, data centers, hard drive clusters, backup generators, etc.), servers grouped together based on performance characteristics (e.g., throughput, input/output operations per second, etc.), and so on). Thus, for rack diversity constraint that seeks to distribute replicas between two racks, the goal may be for half of the replica pairs to be on a first rack and the other half of the replica pairs to be on a second rack without any two members of the same replica pair being in the same rack. Similarly, if the rack diversity constraint specifies that replicas should be spread among three racks, the goal may still be for no two members of the replica pair to be stored in the same rack. In cases where it is not possible to store replicas of a volume equally among all racks, replicas may be distributed as close to evenly as feasible. For example, for a volume with 16 partitions (16 master partitions and 16 slave partitions) being distributed according to a rack constraint of three racks, it may be acceptable to distribute the 32 replicas among three racks such that a first rack has 11 replicas, a second rack has 11 replicas, and a third rack has only 10 replicas. However, if the replicas are not distributed evenly or at least as evenly as feasible, the system performing the process 600 may proceed to 618, whereupon the system may attempt to redistribute the replicas of the volume evenly or as evenly as is feasible. Note, that similar to 608 and 614, the operations of 618 may be combined with the operations of 622 rather than being performed separately and independently.

Otherwise, if the replica pairs are distributed evenly or as evenly as is feasible, the system performing the process 600 may proceed from 616 to 620, whereupon the system may determine whether the replica pair counts between server pairs hosting the replicas of the volume meet a server pair constraint (replica pair counts and server pairs are described in greater detail in the description of FIG. 4). For example, if the server pair constraint specifies that replica pair counts between server pairs should be minimized, if a 16 partition volume has five replica pairs on a first server, two replica pairs on each of a second, third, fourth, fifth, and sixth server, and one replica pair on a seventh server, the system performing the process 600 may attempt to move one of the five replica pairs from the first server to the seventh server and move another of the five replica pairs from the first server to one of the second, third, fourth, fifth, or sixth server in order to more evenly balance the distribution of replica pairs between the server pairs. Note that this example applies the server pair constraint on a volume-by-volume basis (i.e., counting replica pair separately for each volume). As noted, however, it is contemplated that replica pair counts could include replica pairs for any volume having replica pairs between the server pairs, or replica pair counts could be counted on a customer-by-customer basis. That is, replica pair counts made on a customer-by-customer basis replica pairs between server pairs of multiple volumes may be counted together as long as those volumes are assigned to the same customer of a computing resource service provider (i.e., counting replica pairs separately for replica pairs belonging to different customers).

Another example of a server pair constraint could be to first distribute replica pairs (e.g., all volumes, a volume-by-volume, customer-by-customer, etc. as explained above) to any server pairs that have a replica pair count of zero, but once all available server pairs (according to the constraints of 608, 614, and 618) have at least one of the applicable (e.g., all volumes, a volume-by-volume, customer-by-customer, etc.) replica pairs, the next distribution scheme may be to maximize the number of replica pairs on any particular server pair. For example, in a case with a 16 partition volume being distributed between five server pairs, a first server pair may get a first replica pair, a second server pair may get a second replica pair, a third server pair may get a third replica pair, a fourth server pair may get a fourth replica pair, and the fifth server pair may receive the remaining 12 replica pairs. If the system performing the process 600 determines that the replica pair counts are out of compliance with the server pair constraint in effect, the system may proceed to 622, whereupon the system may attempt to reallocate the replica pairs to comply with the server pair constraint. Otherwise, the optimization sweep may be considered complete for the particular volume, and the system may return to 602 to perform the sweep on partitions of another volume. Note that one or more of the operations performed in 602-20 may be performed in various orders and combinations, including in parallel. Note too that the process 600 may be performed according to various schedules, including continuously, periodically, in response to a command from an authorized entity (e.g., customer, network administrator, application, etc.), or in response to the occurrence of a particular event (e.g., input/output operations per second performance of the volume drops below a threshold, a replica is moved, a server or storage device experiences a failure, a constraint is modified, etc.).

Note that, unless otherwise specified, use of expressions regarding executable instructions (also referred to as code, applications, agents, etc.) performing operations that instructions do not ordinarily perform unaided (e.g., transmission of data, calculations, etc.) in the context of describing disclosed embodiments denote that the instructions are being executed by a machine, thereby causing the machine to perform the specified operations.

FIG. 7 illustrates aspects of an example environment 700 for implementing aspects in accordance with various embodiments. As will be appreciated, although a web-based environment is used for purposes of explanation, different environments may be used, as appropriate, to implement various embodiments. The environment includes an electronic client device 702, which can include any appropriate device operable to send and/or receive requests, messages or information over an appropriate network 704 and, in some embodiments, convey information back to a user of the device. Examples of such client devices include personal computers, cell phones, handheld messaging devices, laptop computers, tablet computers, set-top boxes, personal data assistants, embedded computer systems, electronic book readers, and the like. The network 704 can include any appropriate network, including an intranet, the Internet, a cellular network, a local area network, a satellite network or any other network and/or combination thereof. Components used for such a system can depend at least in part upon the type of network and/or environment selected. Protocols and components for communicating via such a network are well known and will not be discussed in detail. Communication over the network 704 can be enabled by wired or wireless connections and combinations thereof. In this example, the network 704 includes the Internet, as the environment includes a web server 706 for receiving requests and serving content in response thereto, although for other networks an alternative device serving a similar purpose could be used as would be apparent to one of ordinary skill in the art.

The illustrative environment includes an application server 708 and a data store 710. It should be understood that there could be several application servers, layers or other elements, processes or components, which may be chained or otherwise configured, which can interact to perform tasks such as obtaining data from an appropriate data store. Servers, as used, may be implemented in various ways, such as hardware devices or virtual computer systems. In some contexts, servers may refer to a programming module being executed on a computer system. As used, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server 708 can include any appropriate hardware, software and firmware for integrating with the data store 710 as needed to execute aspects of one or more applications for the electronic client device 702, handling some or all of the data access and business logic for an application. The application server 708 may provide access control services in cooperation with the data store 710 and is able to generate content including, text, graphics, audio, video and/or other content usable to be provided to the user, which may be served to the user by the web server 706 in the form of HyperText Markup Language ("HTML"), Extensible Markup Language ("XML"), JavaScript, Cascading Style Sheets ("CSS"), or another appropriate client-side structured language. Content transferred to a client device may be processed by the electronic client device 702 to provide the content in one or more forms including, forms that are perceptible to the user audibly, visually and/or through other senses including touch, taste, and/or smell. The handling of all requests and responses, as well as the delivery of content between the electronic client device 702 and the application server 708, can be handled by the web server 706 using PHP: Hypertext Preprocessor ("PHP"), Python, Ruby, Perl, Java, HTML, XML, or another appropriate server-side structured language in this example. It should be understood that the web server 706 and application server 708 are not required and are merely example components, as structured code discussed can be executed on any appropriate device or host machine as discussed elsewhere. Further, operations described as being performed by a single device may, unless otherwise clear from context, be performed collectively by multiple devices, which may form a distributed and/or virtual system.

The data store 710 can include several separate data tables, databases, data documents, dynamic data storage schemes and/or other data storage mechanisms and media for storing data relating to a particular aspect of the present disclosure. For example, the data store 710 may include mechanisms for storing production data 712 and user information 716, which can be used to serve content for the production side. The data store 710 also is shown to include a mechanism for storing log data 714, which can be used for reporting, analysis or other purposes. It should be understood that there can be many other aspects that may need to be stored in the data store 710, such as page image information and access rights information, which can be stored in any of the above listed mechanisms as appropriate or in additional mechanisms in the data store 710. The data store 710 is operable, through logic associated therewith, to receive instructions from the application server 708 and obtain, update or otherwise process data in response thereto. The application server 708 may provide static, dynamic or a combination of static and dynamic data in response to the received instructions. Dynamic data, such as data used in web logs (blogs), shopping applications, news services and other applications may be generated by server-side structured languages as described or may be provided by a content management system ("CMS") operating on, or under the control of, the application server 708. In one example, a user, through a device operated by the user, might submit a search request for a certain type of item. In this case, the data store 710 might access the user information 716 to verify the identity of the user and can access the catalog detail information to obtain information about items of that type. The information then can be returned to the user, such as in a results listing on a web page that the user is able to view via a browser on the electronic client device 702. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 7. Thus, the depiction of the example environment 700 in FIG. 7 should be taken as being illustrative in nature and not limiting to the scope of the disclosure.

The various embodiments further can be implemented in a wide variety of operating environments, which in some cases can include one or more user computers, computing devices or processing devices that can be used to operate any of a number of applications. User or client devices can include any of a number of general purpose personal computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize a network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network 704 can be, for example, a local area network, a wide-area network, a virtual private network, the Internet, an intranet, an extranet, a public switched telephone network, an infrared network, a wireless network, a satellite network, and any combination thereof.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Ruby, PHP, Perl, Python or TCL, as well as combinations thereof. The server(s) may also include database servers, including those commercially available from Oracle®, Microsoft®, Sybase®, and IBM® as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network 7. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, a central processing unit ("CPU" or "processor"), an input device (e.g., a mouse, keyboard, controller, touch screen or keypad), and an output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a wireless or wired network card, an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within a working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided, a person of ordinary skill in the art will appreciate other ways and/or methods to implement the various embodiments.

The specification and drawings are, accordingly, to be regarded in an illustrative rather than a restrictive sense. However, it will be evident that various modifications and changes may be made thereunto without departing from the broader spirit and scope of the invention as set forth in the claims.

Other variations are within the spirit of the present disclosure. Thus, while the techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a," "an," and "the" and similar referents in the context of describing the embodiments (especially in the context of the following claims) are to be construed to cover both the singular and the plural, unless otherwise indicated or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values are merely intended to serve as a shorthand method of referring individually to each separate value falling within the range, unless otherwise indicated and each separate value is incorporated into the specification as if it were individually recited. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," is understood with the context as used in general to present that an item, term, etc., may be either A or B or C, or any nonempty subset of the set of A and B and C, unless specifically stated otherwise or otherwise clearly contradicted by context. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described can be performed in any suitable order unless otherwise indicated or otherwise clearly contradicted by context. Processes described (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising instructions executable by one or more processors. The computer-readable storage medium may be non-transitory.

The use of any examples, or exemplary language (e.g., "such as") provided, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated or otherwise clearly contradicted by context.

All references, including publications, patent applications, and patents, cited are hereby incorporated by reference to the same extent as if each reference were individually and specifically indicated to be incorporated by reference and were set forth in its entirety.

What is claimed is:
1. A computer-implemented method, comprising:
receiving a request for at least one partition placement for placing a partition;
calculating replica pair count, wherein the replica pair count includes a count of pairs of replicated partitions allocated to a customer of a computing resource service provider that are hosted by a pair of servers;
determining a server suitability score based at least in part on the replica pair count, the server suitability score comprising how suitable a server is for placement of a specified partition;
generating the at least one partition placement based at least in part on the server suitability score; and
providing the at least one partition placement.

2. The computer-implemented method of claim 1, further comprising, for a replicated volume comprising partitions, the partitions having a first partition and a second partition, with the first and second partitions being replicas of each other:
perform the receiving, calculating, determining, generating, and providing for the first partition; and
perform the receiving, calculating, determining, generating, and providing for the second partition.

3. The computer-implemented method of claim 1, wherein determining the server suitability score further comprises:
favoring servers with lower replica pair counts when a count of previously provided placements exceeds a threshold; and
favoring servers with higher replica pair counts when the count of previously provided placements does not exceed a threshold.

4. The computer-implemented method of claim 1, wherein:
the partition is a member of a set of replicated partitions of a replicated volume of the customer; and
the replica pair count corresponds to a count of pairs of replicated partitions allocated to the customer.

5. The computer-implemented method of claim 1, wherein the partition placement is one of a plurality of partition placements for placing the partition.

6. A system, comprising:
one or more processors; and
memory including instructions that, when executed by the one or more processors, cause the system to:
receive a request for a placement for placing a partition of a volume;
calculate a partition pair count, wherein the partition pair count includes a count of pairs of replicated partitions of one or more volumes hosted by pairs of computing devices;
determine a suitability score based at least in part on the partition pair count, the suitability score comprising how suitable a computing device is for placement of the partition;
generate the placement based at least in part on the suitability score; and
provide the placement.

7. The system of claim 6, wherein:
the volume is allocated to a customer of a computing resource service provider; and
the one or more volumes included in calculating the partition pair count are allocated to the customer and the one or more volumes includes the volume.

8. The system of claim 6, wherein the one or more volumes included in calculating the partition pair count is one or more replicated volumes allocated to one or more customers.

9. The system of claim 6, wherein the one or more of volumes included in calculating the partition pair count is a replicated volume comprising pairs of replicated partitions including the partition.

10. The system of claim 6, wherein the instructions that cause the system to determine the suitability score further include instructions that cause the system to favor higher partition pair counts.

11. The system of claim 6, wherein the instructions that cause the system to determine the suitability score further include instructions that cause the system to favor lower partition pair counts.

12. The system of claim 6, wherein the instructions that cause the system to determine the suitability score further include instructions that cause the system to, based at least in part on a count of previously provided sets of placements:
favor lower partition pair counts if the count of previously provided sets of placements does not exceed a threshold; and
favor higher partition pair counts, if the count of previously provided sets of placements exceeds the threshold.

13. The system of claim 6, wherein the instructions that cause the system to determine the suitability score further include instructions that cause the system to, based at least in part on a count of previously provided sets of placements:
favor higher partition pair counts if the count of previously provided sets of placements does not exceed a threshold; and
favor lower partition pair counts, if the count of previously provided sets of placements exceeds the threshold.

14. The system of claim 6, wherein the instructions further include instructions that cause the system to, based at least in part on a determination that currently-placed partitions of the volume are out of compliance with a set of constraints, reorganize the currently-placed partitions of the volume.

15. A non-transitory computer-readable storage medium having stored thereon executable instructions that, when executed by one or more processors of a computer system, cause the computer system to at least:
receive at least one placement request for a set of partitions of a volume;
based at least in part on a count of pairs of partitions hosted by pairs of computing devices, determine how suitable the computing devices are for placement of partitions of the set of partitions;
generate a placement based at least in part on the determination; and
provide the placement in response to the at least one placement request.

16. The non-transitory computer-readable storage medium of claim 15, wherein the instructions that determine how suitable the pairs of computing devices are, further include instructions that cause the computer system to favor pairs of computing devices that have a higher count of hosted pairs of partitions than other pairs of computing devices.

17. The non-transitory computer-readable storage medium of claim 15, wherein the instructions that determine how suitable the pairs of computing devices are, further include instructions that cause the computer system to favor pairs of computing devices that have a lower count of hosted pairs of partitions than other pairs of computing devices.

18. The non-transitory computer-readable storage medium of claim 15, wherein the instructions that determine how suitable the pairs of computing devices are, further include instructions that:
if a number of currently-placed partitions of the volume does not exceed a threshold, cause the computer system to more favorably weight a first pair of computing devices than a second pair of computing devices if the first pair of computing devices has a higher count of hosted pairs of partitions than the second pair of computing devices; and
if the number of currently placed partitions of the volume exceeds a threshold, cause the computer system to more favorably weight a first pair of computing devices than a second pair of computing devices if the first pair of computing devices has a lower count of hosted pairs of partitions than the second pair of computing devices.

19. The non-transitory computer-readable storage medium of claim 15, wherein the instructions that cause the computer system to determine how suitable the pairs of computing devices are include instructions that cause the computer system to determine how suitable the pairs of computing devices are for placement of the volume based further in part on performance requirements of the volume.

20. The non-transitory computer-readable storage medium of claim 15, wherein the instructions further include instructions that cause the computer system to save placement state information corresponding to the set of partitions based at least in part on the placement.

21. The non-transitory computer-readable storage medium of claim 15, wherein the placement is one of a plurality of placements generated for the set of partitions.

22. The non-transitory computer-readable storage medium of claim 15, wherein:
- the set of partitions is a pair of partitions comprising a first partition and a second partition, the first and second partitions being replicas of each other; and
- the placements include a set of placements for the first partition and a set of placements for the second partition.

* * * * *